(12) United States Patent
Srivastava et al.

(10) Patent No.: US 9,783,293 B2
(45) Date of Patent: Oct. 10, 2017

(54) UNMANNED AERIAL VEHICLE PLATFORM

(71) Applicant: Verizon Patent and Licensing Inc., Arlington, VA (US)

(72) Inventors: Ashok N. Srivastava, Mountain View, CA (US); Douglas M. Pasko, Bridgewater, NJ (US); Hani Batla, Teaneck, NJ (US); Igor Kantor, Raleigh, NC (US); Gurpreet Ubhi, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 14/282,145

(22) Filed: May 20, 2014

(65) Prior Publication Data
US 2015/0336667 A1 Nov. 26, 2015

(51) Int. Cl.
*B64C 39/02* (2006.01)
*G05D 1/10* (2006.01)
*G06Q 10/00* (2012.01)

(52) U.S. Cl.
CPC .......... *B64C 39/024* (2013.01); *G05D 1/101* (2013.01); *G06Q 10/00* (2013.01); *B64C 2201/128* (2013.01); *B64C 2201/146* (2013.01)

(58) Field of Classification Search
CPC ........... B64C 39/024; B64C 2201/128; B64C 2201/12; B64C 2201/146; H04W 76/045;
(Continued)

(56) References Cited

U.S. PATENT DOCUMENTS 7,848,262 B2 * 12/2010 El-Damhougy .... H04W 76/028
370/255
8,639,396 B1 * 1/2014 Hirsch ................ G08G 5/0008
244/76 R
(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.
(Continued)

*Primary Examiner* — Redhwan K Mawari
*Assistant Examiner* — Alan D Hutchinson

(57) ABSTRACT

A device receives a request for a flight path of UAV from a first location to a second location in a region, and determines, based on credentials associated with the UAV, whether the UAV is authenticated for utilizing the device and a network. The device determines, when the UAV is authenticated, capability information for the UAV based on the request and component information associated with the UAV. The device calculates the flight path from the first location to the second location based on the capability information and one or more of weather information, air traffic information, obstacle information, or regulatory information associated with the region. The device generates flight path instructions for the flight path based on one or more of the weather information, the air traffic information, the obstacle information, or the regulatory information associated with the region, and provides the flight path instructions to the UAV.

20 Claims, 17 Drawing Sheets

(58) Field of Classification Search
CPC ............. H04W 4/021; H04W 72/0406; H04W 84/005; H04W 84/18; G06Q 10/00
See application file for complete search history.

(56) References Cited

U.S. PATENT DOCUMENTS

| | | | |
|---|---|---|---|
| 8,644,512 B2* | 2/2014 | Khazan | G05D 1/0022 380/258 |
| 2011/0118907 A1* | 5/2011 | Elkins | B64B 1/00 701/3 |
| 2015/0067352 A1* | 3/2015 | Winslow | G09C 1/00 713/192 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/jhow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optmization", Cambridge University Press, 2004, 730 pages.

* cited by examiner

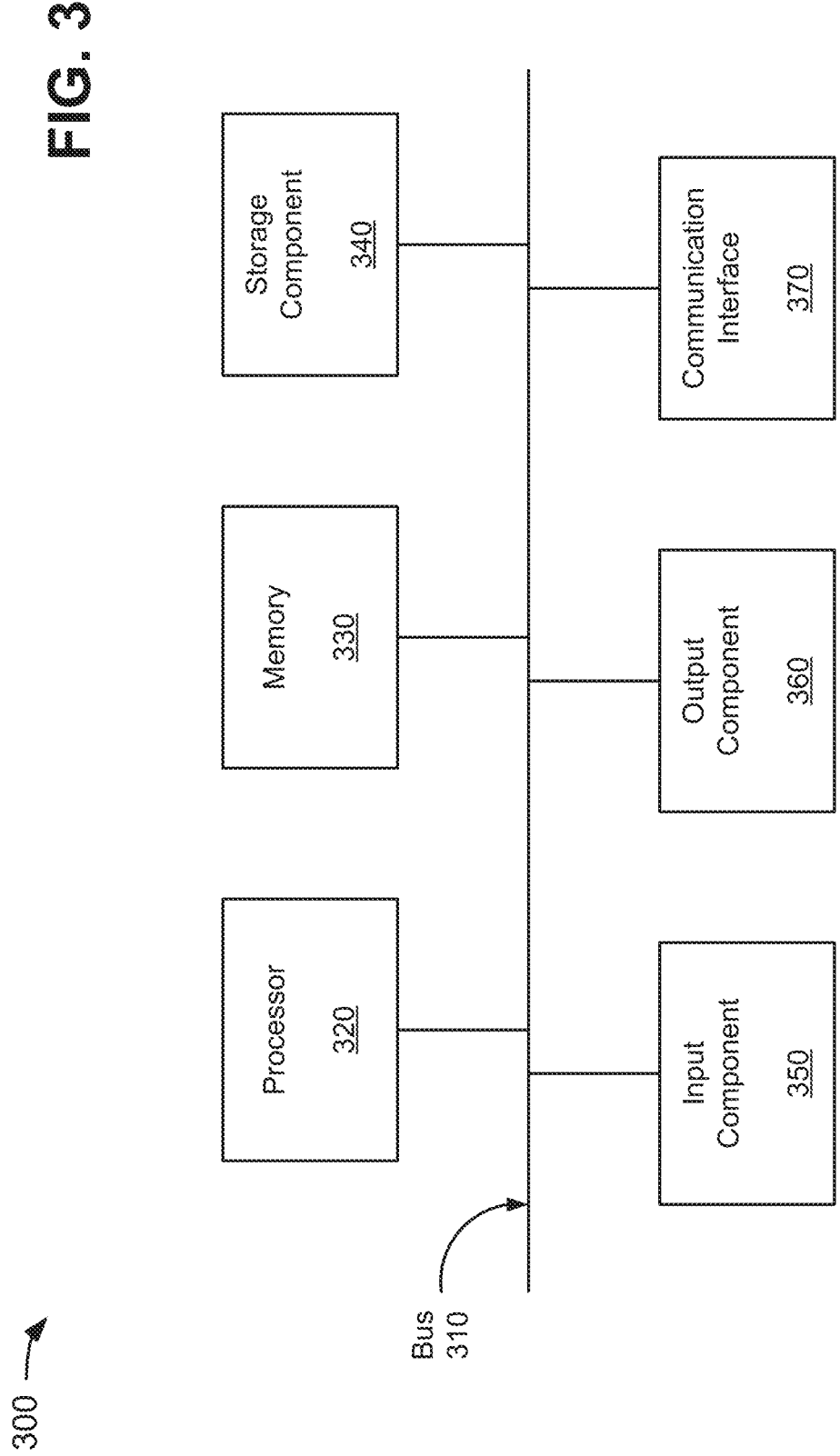

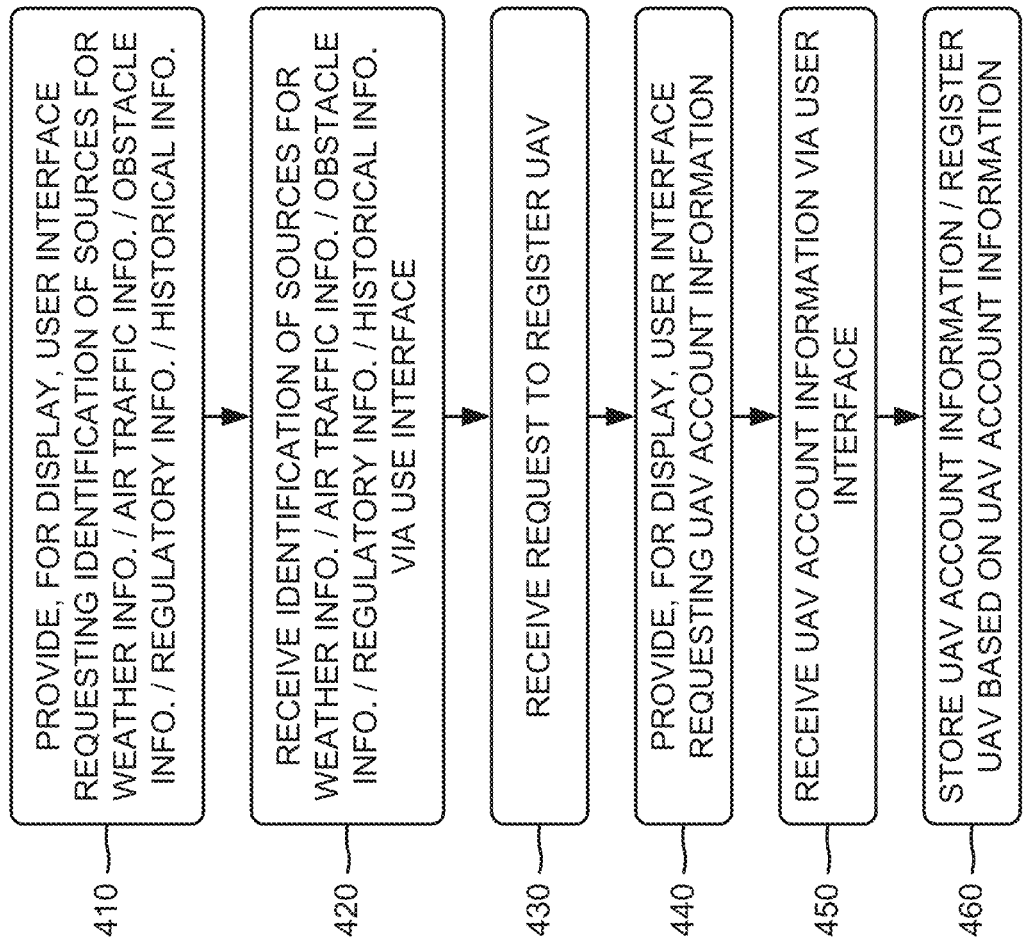

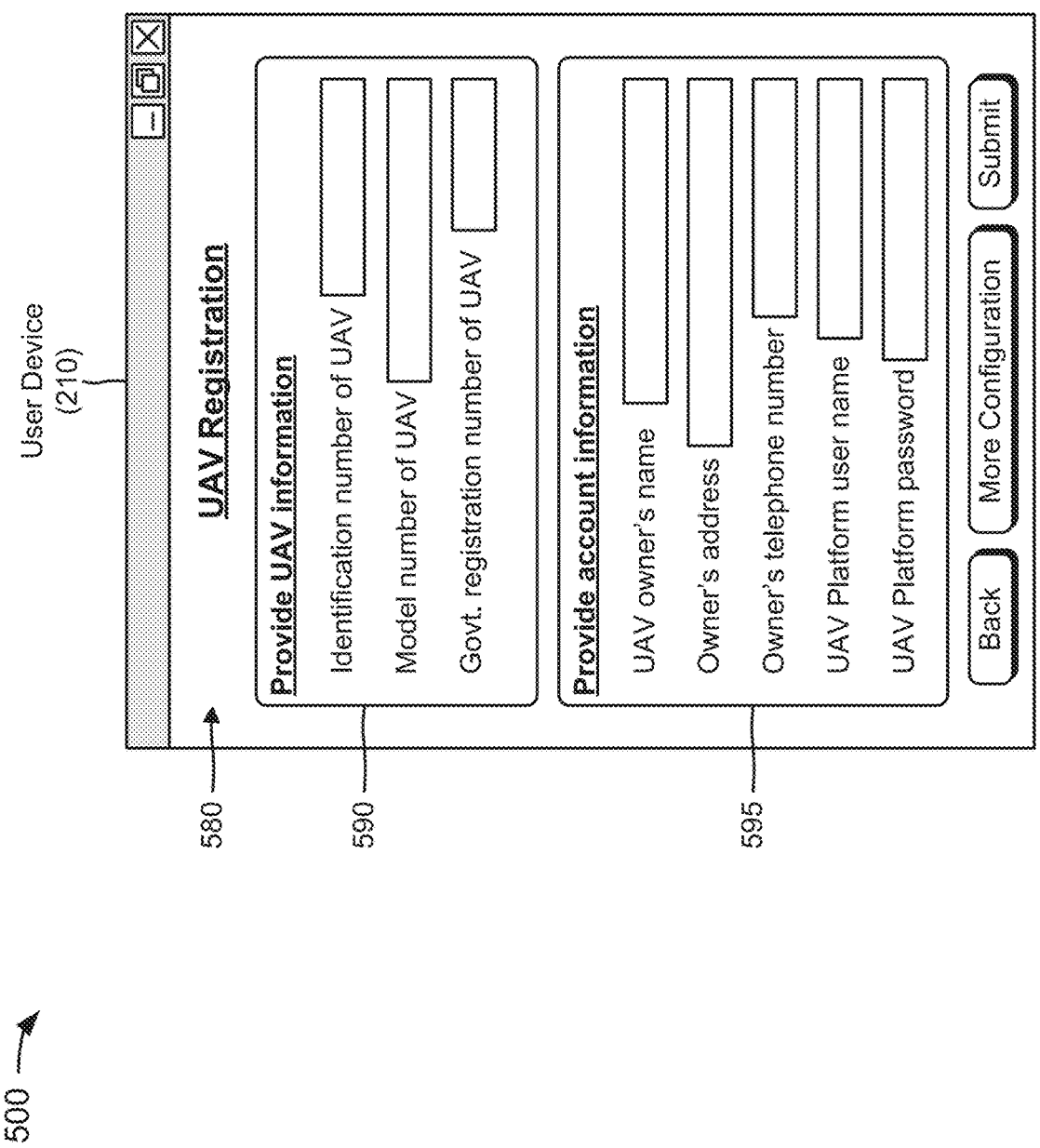

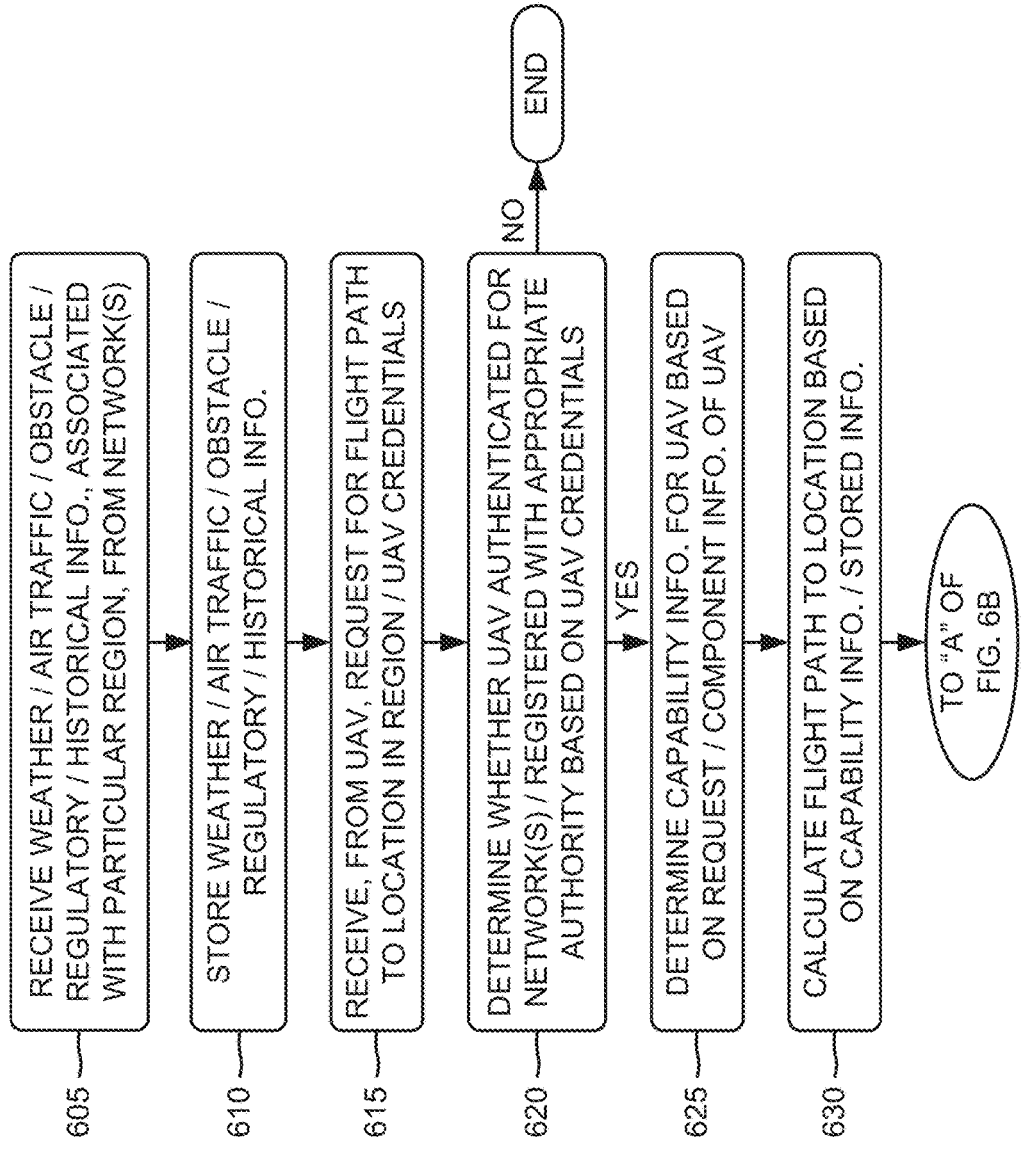

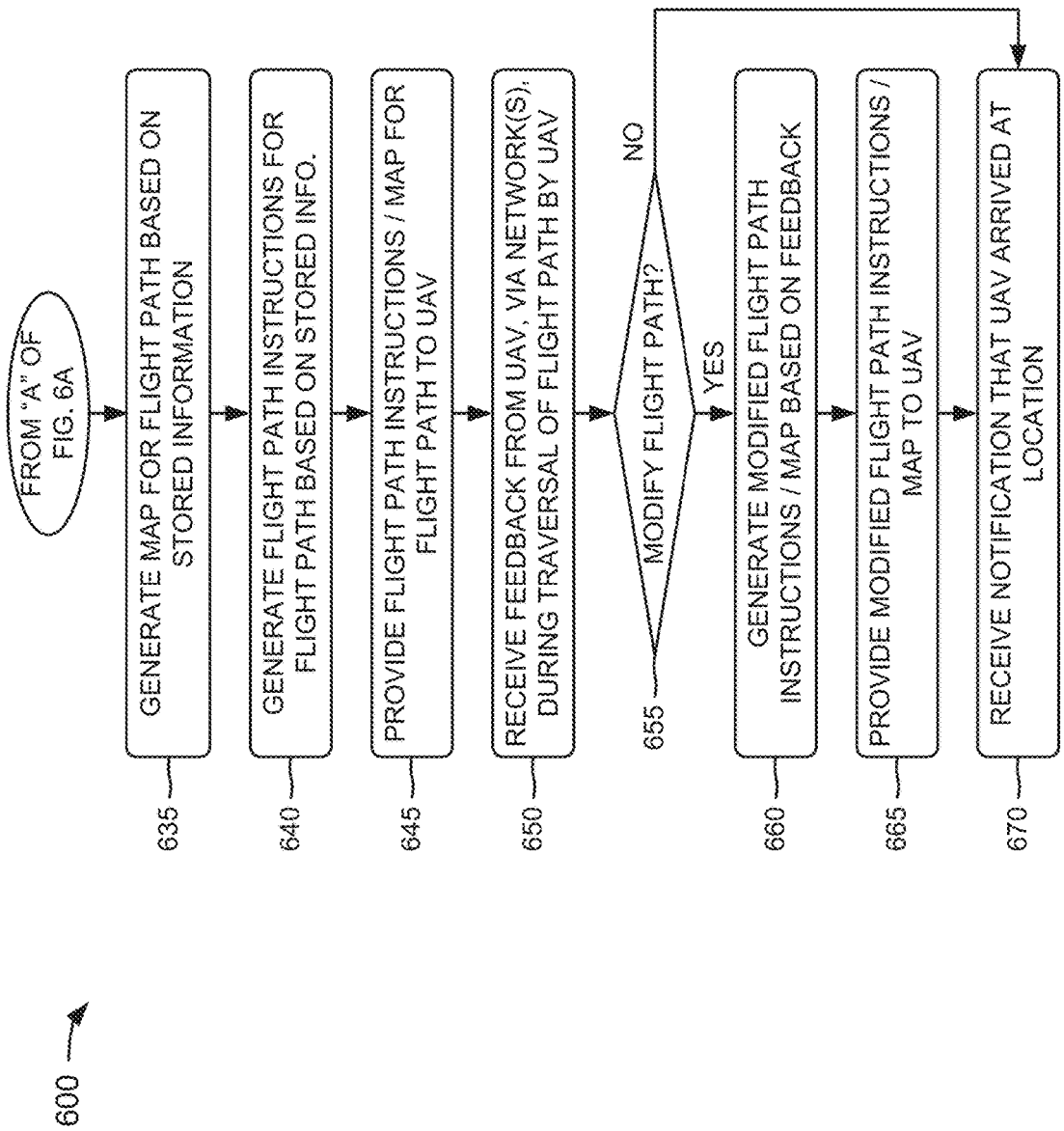

FIG. 7B

Data Storage (235)

| UAV Acct. No. | Acct. Type | Address | Status |
|---|---|---|---|
| 123456 | Corporate | 124 South St. | Paid |
| 789234 | Personal | 887 North St. | Unpaid |
| *** | *** | *** | *** |

Account info. (720)

| Serial No. | Model No. | Component | Capabilities |
|---|---|---|---|
| 232114 | 32678 | Rotor | Thrust |
| 787999 | 565421 | Battery | Hours of op. |
| *** | *** | *** | *** |

Capability info. (725)

| Location | Weather Type | Current Conditions | |
|---|---|---|---|
| Austin, TX | Wind | 10 km/h West | |
| Dallas, TX | Precipitation | Heavy rain | |
| *** | *** | *** | |

Weather info. (730)

Data Storage (235)

Air traffic info. (735)

| Location | Air Traffic Type | Altitude |
|---|---|---|
| GPS coords. | Commercial jet | 10,000 meters |
| GPS coords. | Other UAV | 500 meters |
| *** | *** | *** |

Obstacle info. (740)

| Location | Obstacle Type | Height |
|---|---|---|
| Lat. / long. | Mountain | 1,000 meters |
| 2nd Street in Dallas | Building | 500 meters |
| *** | *** | *** |

Regulatory info. (745)

| Location | Regulatory Type | Altitude |
|---|---|---|
| Restricted base | No fly zone | All |
| 1st Street in Dallas | Govt. building | All |
| *** | *** | *** |

Historical info. (750)

| Flight Path | Altitude | Duration |
|---|---|---|
| Austin to Dallas, TX | 1,000 meters | 35 minutes |
| Austin to Dallas, TX | 2,000 meters | 45 minutes |
| *** | *** | *** |

700

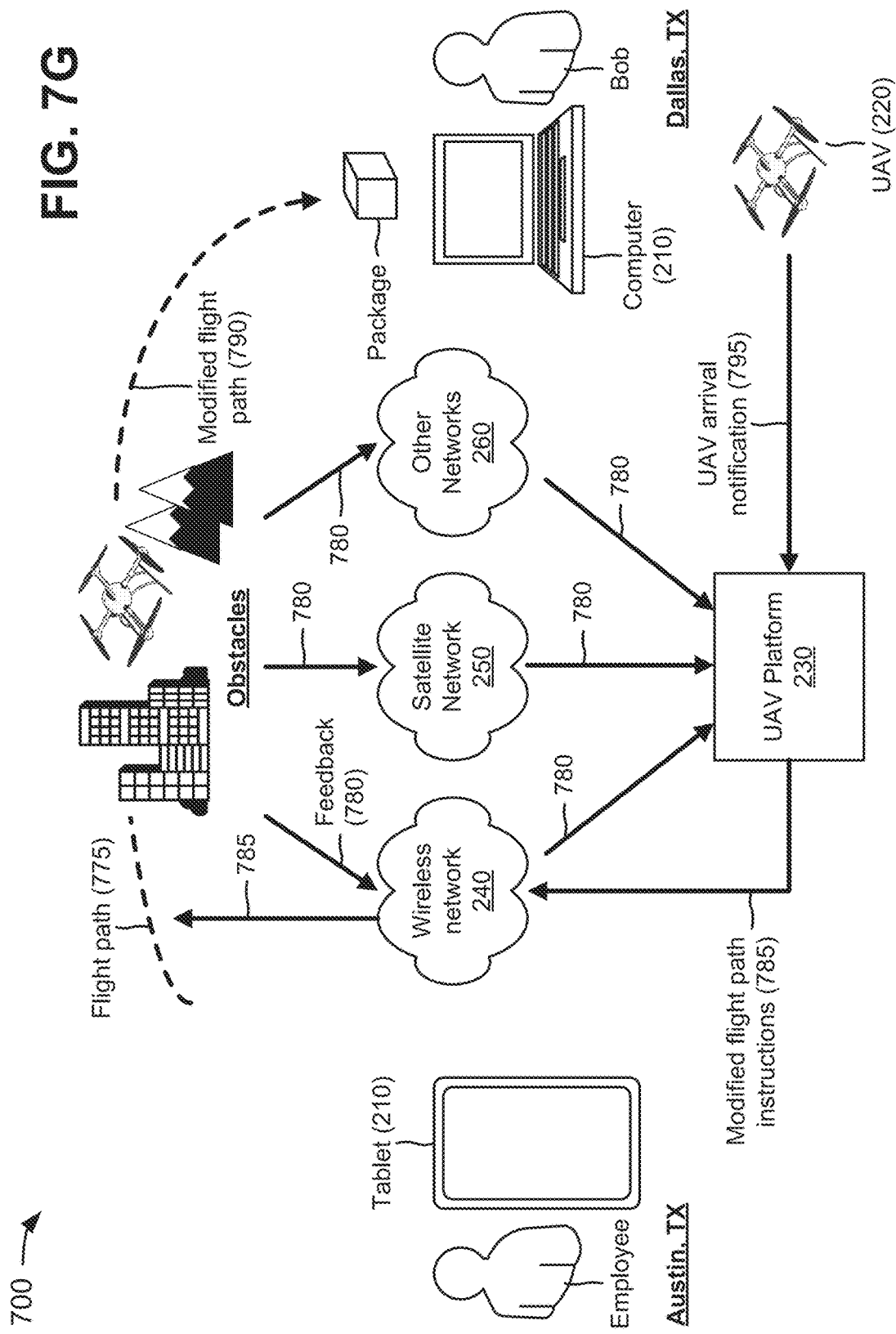

UNMANNED AERIAL VEHICLE PLATFORM

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of applications, such as police surveillance, firefighting, security work (e.g., surveillance of pipelines), surveillance of farms, commercial purposes, etc.

BRIEF DESCRIPTION OF THE DRAWINGS

FIG. 3 is a diagram of example components of one or more devices of FIG. 2;

FIG. 4 is a flow chart of an example process for configuring an unmanned aerial vehicle (UAV) platform and a UAV for utilizing the UAV platform;

FIG. 5A-5C are diagrams of example user interfaces that may be used in connection with the example process shown in FIG. 4;

FIGS. 6A and 6B depict a flow chart of an example process for generating flight path instructions for a UAV to a particular location; and FIGS. 7A-7G are diagrams of an example relating to the example process shown in FIGS. 6A and 6B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
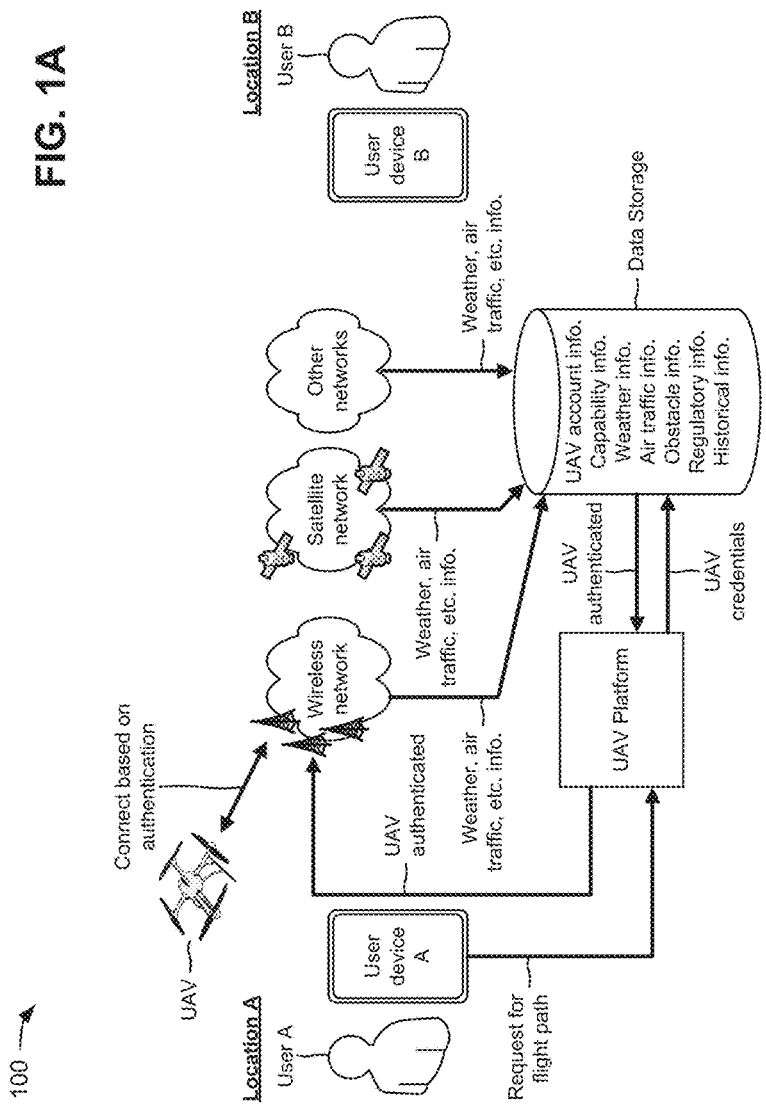
FIGS. 1A and 1B are diagrams of an overview of an example implementation described herein.
Figure 1B:
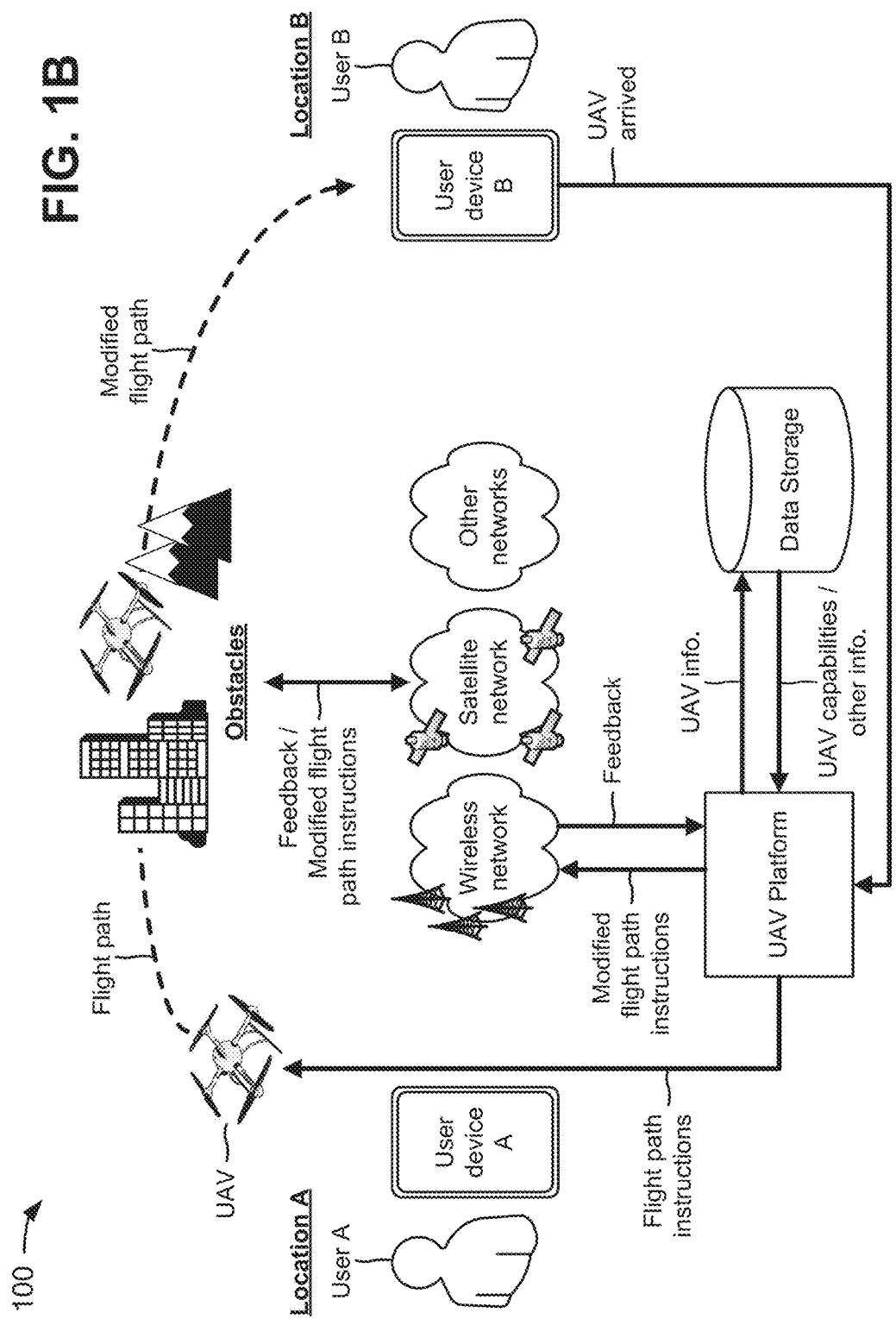

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with a wireless network, a satellite network, and/or other networks. The wireless network, the satellite network, and/or the other networks may provide, to the data storage, capability information associated with UAVs (e.g., thrust, battery life, etc. associated with UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

As further shown in FIG. 1A, user A may instruct user device A (or the UAV) to generate a request for a flight path (e.g., from location A to location B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. As shown in FIG. 1A, assume that the UAV is authenticated, and that the UAV platform provides a message indicating that the UAV is authenticated to one or more of the networks (e.g., to the wireless network). The UAV may connect with the wireless network based on the authentication of the UAV.

As shown in FIG. 1B, the UAV platform may utilize information associated with the UAV (e.g., components of the UAV, the requested flight path, etc.) to identify capabilities of the UAV and other information (e.g., aviation information) in the data storage. For example, the UAV platform may retrieve capability information associated with the UAV and/or other information (e.g., the weather information, the obstacle information, the regulatory information, the historical information, etc. associated with the geographical region) from the data storage. The UAV platform may calculate the flight path from location A to location B based on the capability information and/or the other information, and may generate flight path instructions for the flight path. For example, the flight path instructions may indicate that the UAV is to fly at two-thousand (2,000) meters, for fifty (50) kilometers and fifty-five (55) minutes, in order to arrive at location B. As further shown in FIG. 1B, the UAV platform may provide the flight path instructions to the UAV (e.g., via the wireless network).

The UAV may take off from location A, and may travel the flight path based on the flight path instructions. While the UAV is traveling along the flight path, one or more of the networks may receive feedback from the UAV regarding the flight path (e.g., speed, weather conditions, duration, etc.). Assume that the UAV senses an obstacle (e.g., another UAV) along the flight path, and provides information about the obstacle to the UAV platform (e.g., via the feedback). The UAV platform and/or the UAV may calculate a modified flight path that prevents the UAV from colliding with the other UAV. The UAV platform and/or the UAV may generate modified flight path instructions for the modified flight path. The UAV platform may provide the modified flight path instructions to the UAV, and the UAV may travel the modified flight path, based on the modified flight path instructions, until the UAV arrives at location B. When the UAV arrives at location B, the UAV and/or user device B may generate a notification indicating that the UAV arrived safely at location B, and may provide the notification to the UAV platform.

Systems and/or methods described herein may provide a platform that enables UAVs to safely traverse flight paths from origination locations to destination locations. The systems and/or methods may authenticate UAVs for utilizing wireless, satellite, etc. networks associated with the platform and to ensure that the UAVs are registered with an appropriate authority. The systems and/or methods may prevent UAVs from colliding with unexpected obstacles encountered during flights based on feedback provided by the UAVs to the platform, via the networks. The systems and/or methods may also provide distributed command and control to a UAV and the platform depending on capabilities of the UAV.

Figure 2:
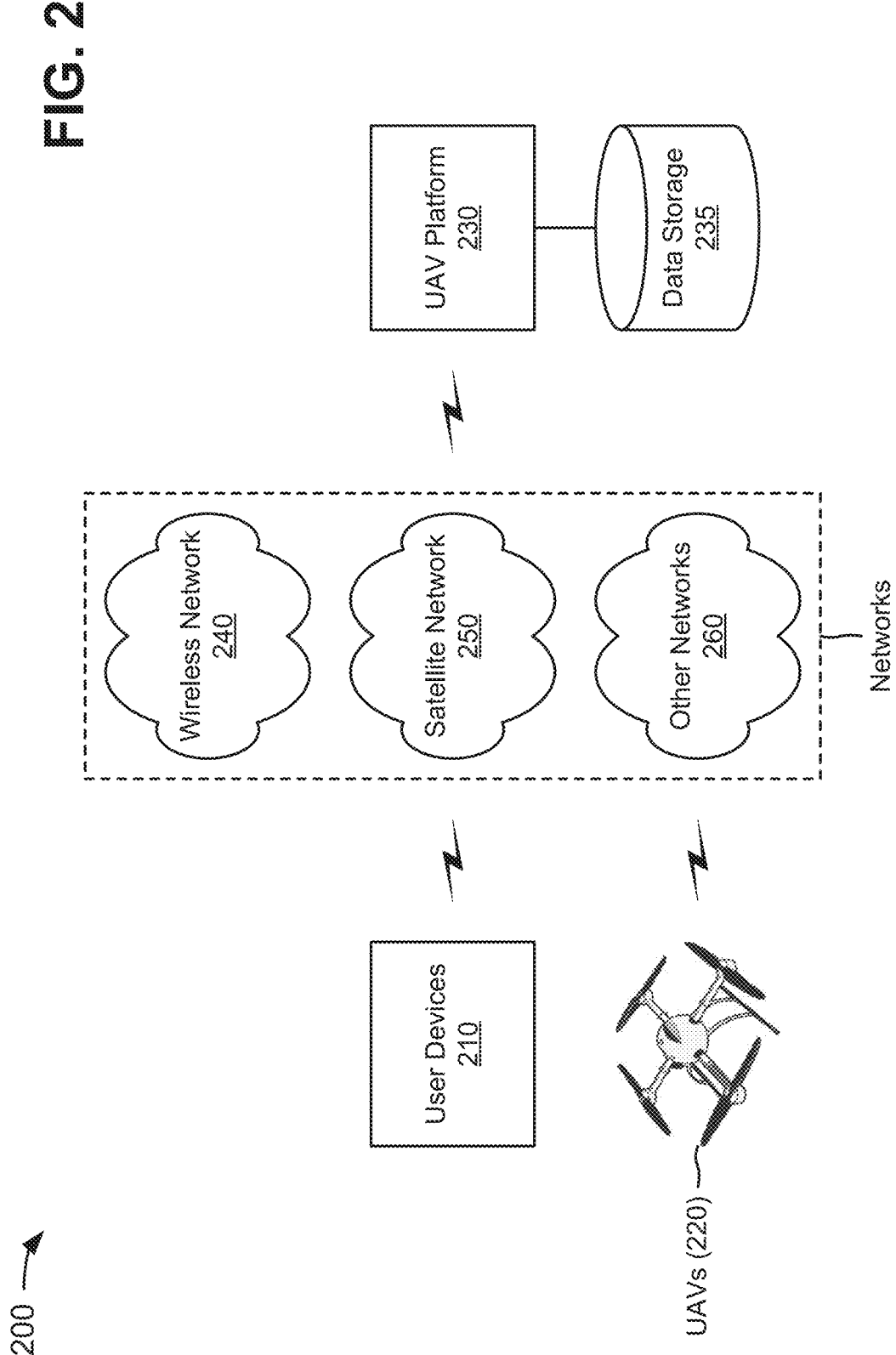
FIG. 2 is a diagram of an example environment in which systems and/or methods described herein may be implemented.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; generate one or more flight paths for UAV 220, etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

In some implementations, UAV 220 may be controlled by UAV platform 230 via communications with UAV platform 230. Additionally, or alternatively, UAV 220 may be controlled by the computational resources of UAV 220. Additionally, or alternatively, UAV 220 may be controlled by the computational resources of UAV 220. Additionally, or alternatively, UAV 220 may controlled by another UAV 220 via communications with the other UAV 220. Additionally, or alternatively, UAV 220 may be controlled by a combination of UAV platform 230, the computational resources of UAV 220, and/or the other UAV 220.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc. In some implementations, UAV platform 230 may receive, from UAV 220, a request for a flight path to a location, and credentials associated with UAV 220. UAV platform 230 may authenticate UAV 220 for use of UAV platform 230 and/or networks 240-260 based on the credentials, and may determine capability information for UAV 220 based on the request and component information of UAV 220. UAV platform 230 may calculate the flight path to the location based on the capability information and/or other information (e.g., weather information, air traffic information, etc.), and may generate flight path instructions for the flight path. UAV platform 230 may provide the flight path instructions to UAV 220, and may receive feedback from UAV 220, via networks 240-260, during traversal of the flight path by UAV 220. UAV platform 230 may modify the flight path instructions based on the feedback, and may provide the modified flight path instructions to UAV 220. UAV platform 230 may receive a notification that UAV 220 arrived at the location when UAV 220 lands at the location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a UAV platform and a UAV for utilizing the UAV platform. In some implementations, one or more process blocks of FIG. 4 may be performed by UAV platform 230. In some implementations, one or more process blocks of FIG. 4 may be performed by another device or a group of devices separate from or including UAV platform 230, such as user device 210 and/or UAV 220.

As shown in FIG. 4, process 400 may include providing, for display, a user interface requesting identification of sources for weather information, air traffic information, obstacle information, regulatory information, and/or historical information (block 410). For example, UAV platform 230 may display, to a user of UAV platform 230, a user interface that requests identification of sources for weather information, air traffic information, obstacle information, regulatory information, historical information, etc. associated with a geographical region. In some implementations, the user may access UAV platform 230 via user device 210 (e.g., via a browser of user device 210), and UAV platform 230 may provide the user interface for display to user device 210.

In some implementations, the weather information may include information associated with precipitation conditions (e.g., rain, snow, sleet, etc.), temperature conditions, wind conditions, cloud conditions, etc. for a geographical location (e.g., at different altitudes). The air traffic information may include information associated with air traffic (e.g., commercial flights, private airplanes, UAVs 220 associated with UAV platform 230 or other platforms, etc.) for the geographical location. The obstacle information may include information associated with obstacles (e.g., mountains, trees, bridges, buildings, cell towers, etc.) in the geographical location. The regulatory information may include information associated with regulated air space (e.g., no fly zones, airports, government buildings, etc.) in the geographical location. The historical information may include historical flight path information, historical weather information, historical air traffic information, etc. for the geographical location.

As further shown in FIG. 4, process 400 may include receiving identification of the sources for the weather information, the air traffic information, the obstacle information, the regulatory information, and/or the historical information via the user interface (block 420). For example, the user may select or indicate, via the user interface, one or more sources for the weather information, the air traffic information, the obstacle information, the regulatory information, and/or the historical information, and UAV platform 230 may receive the selected or indicated sources.

In some implementations, the user may select, as a source for the weather information, a web site and/or another source that provides information generated by a national weather service. Alternatively, or additionally, the user may select, as a source for the weather information, a web site and/or another source that provides information generated by a local weather service. Alternatively, or additionally, the user may select, as a source for the weather information, a satellite network that provides weather information.

In some implementations, the user may select, as a source for the air traffic information, a web site and/or another source that provides information generated by a government aviation agency (e.g., a local, state, or federal aviation agency). Alternatively, or additionally, the user may select, as a source for the air traffic information, a web site and/or another source that provides information generated by UAV platforms other than UAV platform 230. Alternatively, or additionally, the user may select, as a source for the air traffic information, a satellite network that provides air traffic information.

In some implementations, the user may select, as a source for the obstacle information, a web site and/or another source that provides information generated by a government geological agency (e.g., a local, state, or federal geological agency). Alternatively, or additionally, the user may select, as a source for the obstacle information, a web site and/or another source that provides information generated by UAV platforms other than UAV platform 230. Alternatively, or additionally, the user may select, as a source for the obstacle information, a web site and/or another source that provides a listing of building heights and locations.

In some implementations, the user may select, as a source for the regulatory information, a web site and/or another source that provides information generated by a government regulatory agency (e.g., a government aviation agency, another branch of a government, etc.). Alternatively, or additionally, the user may select, as a source for the regulatory information, a web site and/or another source that provides information generated by a local regulatory agency (e.g., state and/or local aviation agencies, local airports, etc.). Alternatively, or additionally, the user may select, as a source for the regulatory information, a web site and/or another source that provides restricted, prohibited, and/or controlled airspace information (e.g., airspace over government buildings, restricted areas, etc.).

In some implementations, the user may select, as a source for the historical information, a web site and/or another source that provides information associated with historical flight paths between locations. Alternatively, or additionally, the user may select, as a source for the historical information, a web site and/or another source that provides information associated with historical weather conditions (e.g., historical weather information). Alternatively, or additionally, the user may select, as a source for the historical information, a web site and/or another source that provides historical air traffic information.

As further shown in FIG. 4, process 400 may include receiving a request to register a UAV (block 430). For example, a user may cause user device 210 to provide, to UAV platform 230, a request to register UAV 220 associated with the user, and UAV platform 230 may receive the request. In some implementations, the user may cause user device 210 to access UAV platform 230 via, for example, a user interface (such as a browser) or in another manner. The user may then select, using user device 210, information regarding registering a UAV 220 from the user interface to cause user device 210 to provide the request to UAV platform 230. In some implementations, the user may cause UAV 220 to provide, to UAV platform 230, the request to register UAV 220.

As further shown in FIG. 4, process 400 may include providing, for display, a user interface requesting UAV account information (block 440). For example, based on the request to register UAV 220, UAV platform 230 may provide for display, to user device 210, a user interface that requests UAV account information associated with UAV 220. In some implementations, the UAV account information may include an identification number of UAV 220, a model number of UAV 220, serial numbers of components (e.g., rotors, batteries, etc.) of UAV 220, a government registration number of UAV 220, and/or other information that identifies UAV 220. Alternatively, or additionally, the UAV account information may include user information (e.g., a name of an owner of UAV 220, an address of the owner, a user name and a password of the owner for accessing UAV platform 230, etc.).

As further shown in FIG. 4, process 400 may include receiving the UAV account information via the user interface (block 450). For example, UAV platform 230 may receive the UAV account information from user device 210 and via the user interface. In some implementations, a government registration number of UAV 220 may be received by UAV platform 230 from an appropriate authority (e.g., a government agency).

As further shown in FIG. 4, process 400 may include storing the UAV account information and registering the UAV based on the UAV account information (block 460). For example, UAV platform 230 may store all or a portion of the UAV account information received from user device 210. In some implementations, UAV platform 230 may store all or a portion of the UAV account information in data storage 235. In some implementations, UAV platform 230 may register UAV 220 for utilizing services provided by UAV platform 230 and/or one or more of networks 240-260 based on the UAV account information.

In some implementations, user device 210 and/or UAV 220 may provide updates, to the UAV account information, to UAV platform 230. For example, user device 210 and/or UAV 220 may provide updates to the name of the owner of UAV 220, the address of the owner, etc., and may store the updates to the UAV account information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
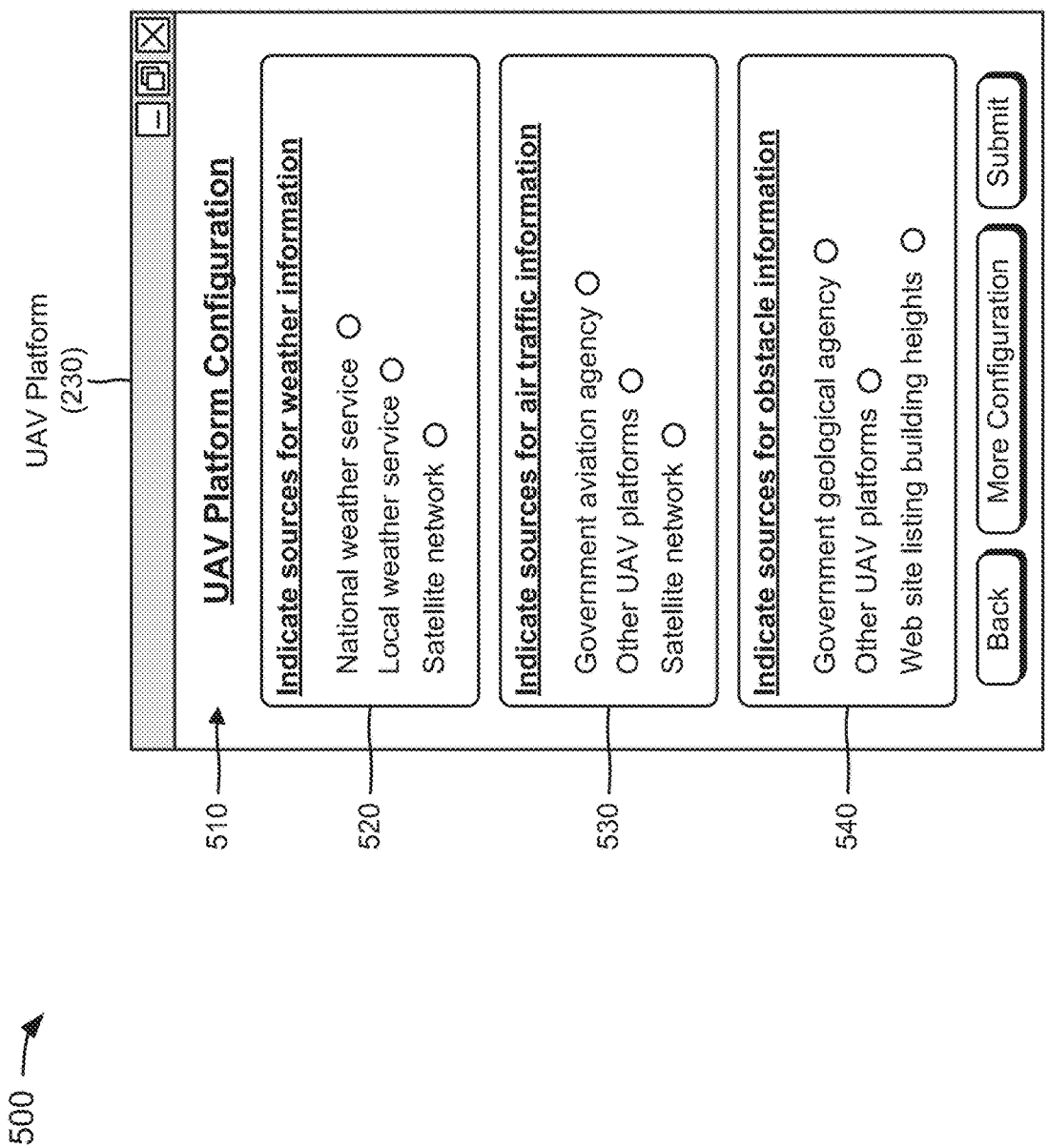
Figure 5B:
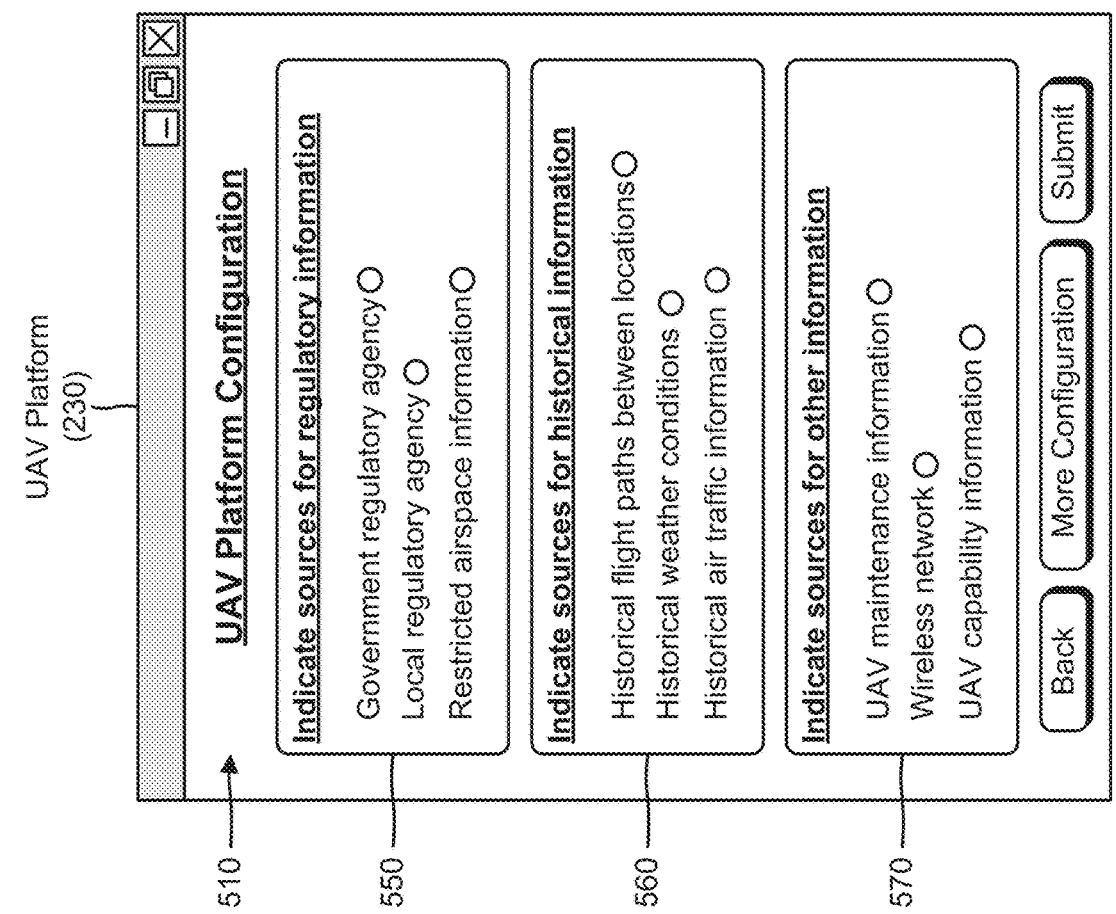

FIG. 5A-5C are diagrams of example user interfaces that may be used in connection with example process 400 shown in FIG. 4. Assume that a user of UAV platform 230 requests to configure UAV platform 230 (e.g., via user device 210 or directly via UAV platform 230). When the user requests to configure UAV platform 230, as shown in FIG. 5A, UAV platform 230 may provide a user interface 510 for display to the user. User interface 510 may allow the user to configure different features of UAV platform 230. For example, the user may identify sources for weather information (e.g., for UAV platform 230) in a first configuration section 520 of user interface 510. In some implementations, the user may identify, as a source for the weather information, a web site and/or another source that provides information generated by a national weather service. For example, the user may identify web sites, such as www.noaa.gov, www.weather.com, etc., as sources for information generated by a national weather service. Alternatively, or additionally, the user may identify, as a source for the weather information, a web site and/or another source that provides information generated by a local weather service. For example, the user may identify a web site associated with a local news channel, as a source for information generated by a local weather service. Alternatively, or additionally, the user may identify, as a source for the weather information, a satellite network that provides weather information.

As further shown in FIG. 5A, the user may identify sources for air traffic information (e.g., for UAV platform 230) in a second configuration section 530 of user interface 510. In some implementations, the user may identify, as a source for the air traffic information, a web site and/or another source that provides information generated by a government aviation agency. For example, the user may identify a web site, such as www.faa.gov, as a source for information generated by a government aviation agency. Alternatively, or additionally, the user may identify, as a source for the air traffic information, a web site and/or another source that provides information generated by UAV platforms other than UAV platform 230. Alternatively, or additionally, the user may identify, as a source for the air traffic information, a satellite network that provides air traffic information.

As further shown in FIG. 5A, the user may identify sources for obstacle information (e.g., for UAV platform 230) in a third configuration section 540 of user interface 510. In some implementations, the user may identify, as a source for the obstacle information, a web site and/or another source that provides information generated by a government geological agency. For example, the user may identify a web site, such as www.usgs.gov, as a source for information generated by a government geological agency. Alternatively, or additionally, the user may identify, as a source for the obstacle information, a web site and/or another source that provides information generated by UAV platforms other than UAV platform 230. Alternatively, or additionally, the user may identify, as a source for the obstacle information, a web site and/or another source that provides a listing of building heights and locations.

As shown in FIG. 5B, the user may identify sources for regulatory information (e.g., for UAV platform 230) in a fourth configuration section 550 of user interface 510. In some implementations, the user may identify, as a source for the regulatory information, a web site and/or another source that provides information generated by a government regulatory agency. For example, the user may identify a web site, such as www.faa.gov, as a source for information generated by a government regulatory agency. Alternatively, or additionally, the user may identify, as a source for the regulatory information, a web site and/or another source that provides information generated by a local regulatory agency. Alternatively, or additionally, the user may identify, as a source for the regulatory information, a web site and/or another source that provides restricted, prohibited, and/or controlled airspace information.

As further shown in FIG. 5B, the user may identify sources for historical information (e.g., for UAV platform 230) in a fifth configuration section 560 of user interface 510. In some implementations, the user may identify, as a source for the historical information, a web site and/or another source that provides information associated with historical flight paths between locations. Alternatively, or additionally, the user may identify, as a source for the historical information, a web site and/or another source that provides information associated with historical weather conditions. Alternatively, or additionally, the user may identify, as a source for the regulatory information, a web site and/or another source that provides historical air traffic information.

As further shown in FIG. 5B, the user may identify sources for other information (e.g., for UAV platform 230) in a sixth configuration section 570 of user interface 510. In some implementations, the user may identify, as a source for the other information, a web site and/or another source that provides information associated with maintenance of UAVs 220. For example, UAVs 220 may be required to follow a maintenance schedule (e.g., for safety purposes), and may need to be certified (e.g., by a government agency) that the maintenance schedule is followed. Alternatively, or additionally, the user may identify, as a source for the other information, a wireless network, such as wireless network 240. Alternatively, or additionally, the user may identify, as a source for the other information, a web site and/or another source that provides information associated with capabilities of UAVs 220 (e.g., battery life, rotor thrusts, maximum altitudes, temperature limits, etc.).

In some implementations, the configuration of UAV platform 230 may include any combination of the aforementioned sources for information. Once the user has identified the configuration of UAV platform 230, user interface 510 may allow the user to select a "Submit" option to store the identified sources for information and/or submit the identified sources for information to UAV platform 230. UAV platform 230 may then communicate with the identified sources for information in order to obtain information from the sources for information.

As further shown in FIGS. 5A and 5B, user interface 510 may also allow the user to select a "Back" option to cause UAV platform 230 to provide information regarding UAV platform 230. As also shown in FIGS. 5A and 5B, user interface 510 may also allow the user to select a "More Configuration" option to enable the user to identify additional information that may be used to configure UAV platform 230.

Now assume that a user of user device 210 and/or UAV 220 causes user device 210 to provide, to UAV platform 230, a request to register UAV 220 with UAV platform 230 and/or one or more of networks 240-260. When UAV platform 230 receives the request, as shown in FIG. 5C, UAV platform 230 may provide a user interface 580 for display to user device 210, and user device 210 may display user interface 580 to the user. User interface 580 may allow the user to register UAV 220 with UAV platform 230 and/or one or more of networks 240-260. For example, the user may provide information associated with UAV 220 in a first configuration section 590 of user interface 580. In some implementations, the user may provide an identification number (e.g., a serial number) of UAV 220 in first configuration section 590. Alternatively, or additionally, the user may provide a model number of UAV 220 in first configuration section 590. Alternatively, or additionally, the user may provide a government registration number of UAV 220 in first configuration section 590.

As further shown in FIG. 5C, the user may provide account information in a second configuration section 595 of user interface 580. In some implementations, the user may provide a name of the owner of UAV 220 in second configuration section 595. Alternatively, or additionally, the user may provide an address of the owner in second configuration section 595. Alternatively, or additionally, the user may provide a telephone number of the owner in second configuration section 595. Alternatively, or additionally, the user may provide a user name of the owner (e.g., for UAV platform 230) in second configuration section 595. Alternatively, or additionally, the user may provide a password of the owner (e.g., for UAV platform 230) in second configuration section 595. In some implementations, the user name and password may permit the owner (or a representative of the owner) to log into and access UAV platform 230.

In some implementations, the registration of UAV 220 with UAV platform 230 may include any combination of the aforementioned information. Once the user has identified the information required to register UAV 220 with UAV platform 230, user interface 580 may allow the user to select a "Submit" option to store the information and/or submit the information to UAV platform 230. In some implementations, UAV platform 230 may store the information in a data structure provided in data storage 235.

As further shown in FIG. 5C, user interface 580 may also allow the user to select a "Back" option to cause UAV platform 230 to provide information regarding UAV platform 230. As also shown in FIG. 5C, user interface 580 may also allow the user to select a "More Configuration" option to enable the user to identify additional information that may be used to register UAV 220 with UAV platform 230.

The number of elements of the user interfaces shown in FIGS. 5A-5C is provided for explanatory purposes. In practice, the user interfaces may include additional elements, fewer elements, different elements, or differently arranged elements than those shown in FIGS. 5A-5C. In some implementations, information provided by the user interfaces depicted in FIGS. 5A-5C may include textual information and/or an audible form of the textual information.

FIGS. 6A and 6B is a flow chart of an example process 600 for generating flight path instructions for a UAV to a particular location. In some implementations, one or more process blocks of FIGS. 6A and 6B may be performed by UAV platform 230. In some implementations, one or more process blocks of FIGS. 6A and 6B may be performed by another device or a group of devices separate from or including UAV platform 230, such as user device 210 and/or UAV 220.

As shown in FIG. 6A, process 600 may include receiving weather information, air traffic information, obstacle information, regulatory information, and/or historical information, associated with a particular region, from one or more networks (block 605). For example, UAV platform 230 may receive weather information, air traffic information, obstacle information, regulatory information, and/or historical information, associated with a particular region, from one or more of networks 240-260. In some implementations, UAV platform 230 may receive the weather information, the air traffic information, the obstacle information, the regulatory information, and/or the historical information from the sources identified via user interface 510 (FIGS. 5A and 5B).

As further shown in FIG. 6A, process 600 may include storing the weather information, the air traffic information, the obstacle information, the regulatory information, and/or the historical information (block 610). For example, UAV platform 230 may store the weather information, the air traffic information, the obstacle information, the regulatory information, and/or the historical information in memory (e.g., memory 330 and/or storage component 340, FIG. 3) associated with UAV platform 230. In some implementations, UAV platform 230 may store the weather information, the air traffic information, the obstacle information, the regulatory information, and/or the historical information in one or more data structures (e.g., tables, lists, databases, etc.) provided in data storage 235.

As further shown in FIG. 6A, process 600 may include receiving, from a UAV, a request for a flight path to a location in the particular region, and credentials of the UAV (block 615). For example, UAV platform 230 may receive, from UAV 220, a request for a flight path to a location in the particular region, and credentials associated with UAV 220. In some implementations, user device 210 may provide information associated with the flight path to UAV 220, and UAV 220 may provide the request for the flight path to UAV platform 230. In some implementations, the request for the flight path may be provided by user device 210 to UAV platform 230. In some implementations, the request for the flight path may include a request for flight path instructions from an origination location (e.g., a current location of UAV 220) to a destination location (e.g., the location in the particular region). The origination location and the destination location may be provided in the particular region. In some implementations, the credentials of UAV 220 may include an identification number, a model number, a serial number, an identifier of a UICC (or another type of smart card), a government registration number, etc. associated with UAV 220. In some implementations, the credentials of UAV 220 may include information identifying components of UAV 220 (e.g., serial numbers, model numbers, part numbers, etc. of the components).

In some implementations, the request may include a predetermined set of rules and/or actions for UAV 220 to perform when certain conditions occur. For example, if UAV 220 is delivering a package to a home and nobody is present at the home, UAV 220 may be pre-programmed to utilize alternate location(s) for delivering the package. In another example, if UAV 220 is to survey a field of craps and determine whether there is blight, UAV 220 may be pre-programmed with a rule that specifies if blight is identified at locations of the crops, then report or appropriately treat the locations where blight is identified. In still another example, if UAV 220 is traversing the flight path and loses connectivity with UAV platform 230, UAV 220 may be pre-programmed with a default action (e.g., return to the origination location, travel to particular GPS coordinates, etc.). In some implementations, the set of rules and/or actions may be optional or may be in addition to the flight path instructions of UAV 220.

As further shown in FIG. 6A, process 600 may include determining whether the UAV is authenticated for the network(s) and is registered with an appropriate authority based on the UAV credentials (block 620). For example, UAV platform 230 may determine whether UAV 220 is authenticated for using UAV platform 230 and/or one or more of networks 240-260 based on the credentials of UAV 220. In some implementations, UAV platform 230 may compare the credentials of UAV 220 with the UAV account information stored in data storage 235 (e.g., as described above in connection with FIG. 5C) in order to determine whether UAV 220 is authenticated for using UAV platform 230 and/or one or more of networks 240-260. For example, if the credentials of UAV 220 include a serial number of UAV 220, UAV platform 230 may compare the serial number to the UAV account information in data storage 235 to determine whether UAV 220 is registered with UAV platform 230, whether an account of UAV 220 is in good standing (e.g., paid for), etc. In some implementations, UAV platform 230 may determine whether UAV 220 is authenticated for using UAV platform 230 and/or one or more of networks 240-260 based on a UICC associated with UAV 220.

In some implementations, UAV platform 230 may determine whether UAV 220 is registered with an appropriate authority (e.g., a government agency) based on the credentials of UAV 220. For example, if the credentials of UAV 220 include a government registration number of UAV 220, UAV platform 230 may compare the government registration number to the UAV account information in data storage 235 to determine whether UAV 220 is registered with a government agency to legally fly in airspace regulated by the government agency. In some implementations, UAV 220 may include a common protocol with other UAVs 220. The common protocol may enable UAV 220 to be authenticated for using UAV platform 230 and/or one or more of networks 240-260, to communicate with the other UAVs 220, and/or to be verified as being registered with an appropriate authority. For example, if a particular UAV 220 is flying in an area where the particular UAV 220 loses communication with wireless network 240, UAV 220 may establish communications with other UAVs 220 located near the particular UAV 220 (e.g., via the common protocol). The other UAVs 220 may share information (e.g., received from wireless network 240) with the particular UAV 220 via the communications.

In some implementations, UAV 220 may be authenticated via "plug-and-play" authentication by UAV platform 230. For example, UAV 220 may include communication and/or flight (e.g., guidance, navigation, control, surveillance, etc.) components that may adhere to a standard(s) and may be automatically discovered by UAV platform 230 and/or networks 240-260 without a need for configuration and/or user intervention.

As further shown in FIG. 6A, if the UAV is not authenticated for the network(s) and/or is not registered with an appropriate authority (block 620—NO), process 600 may end. For example, if UAV platform 230 determines that UAV 220 is not authenticated for using UAV platform 230 and/or one or more of networks 240-260 based on the credentials of UAV 220, UAV platform 230 may deny the request for the flight path. In some implementations, UAV platform 230 may provide, to UAV 220, a notification indicating that the request for the flight path is denied due to UAV 220 not being authenticated for using UAV platform 230 and/or one or more of networks 240-260. In some implementations, UAV platform 230 may determine that UAV 220 is not authenticated for using UAV platform 230 and/or one or more of networks 240-260 when UAV 220 is not registered with UAV platform 230, an account of UAV 220 is not in good standing, etc.

Alternatively, or additionally, if UAV platform 230 determines that UAV 220 is not registered with an appropriate authority based on the credentials of UAV 220, UAV platform 230 may deny the request for the flight path. In some implementations, UAV platform 230 may provide, to UAV 220, a notification indicating that the request for the flight path is denied due to UAV 220 not being registered with an appropriate authority. In some implementations, UAV platform 230 may determine that UAV 220 is not registered with an appropriate authority when UAV 220 fails to provide a government registration number via the credentials of UAV 220.

As further shown in FIG. 6A, if the UAV is authenticated for the network(s) and is registered with an appropriate authority (block 620—YES), process 600 may include determining capability information for the UAV based on the request and component information of the UAV (block 625). For example, if UAV platform 230 determines, based on the credentials of UAV 220, that UAV 220 is authenticated for using UAV platform 230 and/or one or more of networks 240-260 and is registered with an appropriate authority, UAV platform 230 may approve the request for the flight path. In some implementations, UAV platform 230 may determine that UAV 220 is authenticated for using UAV platform 230 and/or one or more of networks 240-260 when UAV 220 is registered with UAV platform 230, an account of UAV 220 is paid, etc. In some implementations, UAV platform 230 may determine that UAV 220 is registered with an appropriate authority when UAV 220 provides a government registration number that matches a government registration number provided in data storage 235.

In some implementations, if UAV platform 230 approves the request for the flight path, UAV platform 230 may determine capability information for UAV 220 based on the request for the flight path and component information of UAV 220 (e.g., provided with the request for the flight path). For example, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

In some implementations, UAVs 220 may be required to follow a maintenance schedule (e.g., for safety purposes), and may need to be certified (e.g., by a government agency) that the maintenance schedule is followed. Such information may be provided in data storage 235 (e.g., with the capability information). In some implementations, if UAV platform 230 determines that UAV 220 is authenticated for using UAV platform 230 and/or one or more of networks 240-260 and is registered with an appropriate authority, UAV platform 230 may still deny the request for the flight path if UAV platform 230 determines that UAV 220 has not properly followed the maintenance schedule. This may enable UAV platform 230 to ensure that only properly maintained UAVs 220 are permitted to fly, which may increase safety associated with UAVs 220 utilizing airspace. In some implementations, UAVs 220 may include different components and/or capabilities, and UAV platform 230 may require UAV 220 to include a minimum amount of components and/or capabilities before authenticated UAV 220. In some implementations, UAV platform 230 may support UAVs 220 that require different levels of human involvement (e.g., from very little human intervention to a high level of human intervention).

As further shown in FIG. 6A, process 600 may include calculating the flight path to the location based on the capability information and the stored information (block 630). For example, UAV platform 230 may calculate the flight path to the location based on the determined capability information associated with UAV 220 and/or the weather information, the air traffic information, the obstacle information, the regulatory information, and/or the historical information stored in UAV platform 230 and/or data storage 235. In some implementations, UAV platform 230 may determine whether the capability information indicates that UAV 220 may safely complete the flight path to the location without stopping. If UAV platform 230 determines that UAV 220 cannot safely complete the flight path to the location without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information. For example, UAV platform 230 may determine that, without weather issues, the flight path to the location may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes. UAV platform 230 may then determine whether UAV 220 is capable of flying the extra thirty minutes in the headwind (e.g., whether UAV 220 has adequate battery life or fuel).

Alternatively, or additionally, UAV platform 230 may calculate the flight path based on the capability information associated with UAV 220 and the air traffic information. For example, UAV platform 230 may determine that, without air traffic issues, the flight path to the location may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase possibility that UAV 220 may collide with another UAV 220. UAV platform 230 may then determine whether UAV 220 is capable of safely flying at the altitude of five-hundred meters without colliding with another UAV 220. In some implementations, UAV platform 230 may integrate flight paths of UAVs 220 with existing and appropriate airspace classes that are specified by regulators.

Alternatively, or additionally, UAV platform 230 may calculate the flight path based on the capability information associated with UAV 220 and the obstacle information. For example, UAV platform 230 may determine that, without obstacle issues, the flight path to the location may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes. UAV platform 230 may then determine whether UAV 220 is capable of flying the extra thirty minutes.

Alternatively, or additionally, UAV platform 230 may calculate the flight path based on the capability information associated with UAV 220 and the regulatory information. For example, UAV platform 230 may determine that, without regulatory issues, the flight path to the location may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes. UAV platform 230 may then determine whether UAV 220 is capable of flying the extra thirty minutes.

Alternatively, or additionally, UAV platform 230 may calculate the flight path based on the capability information associated with UAV 220 and the historical information. For example, UAV platform 230 may identify prior flight paths to the location from the historical information, and may select one of the prior flight paths, as the flight path, based on the capability information associated with UAV 220. In some implementations, UAV platform 230 may identify prior flight paths that include flight times of two hours, three hours, and four hours, and may determine that UAV 220 may safely fly for two hours and thirty minutes (e.g., based on the capability information). In such implementations, UAV platform 230 may select, as the flight path, the prior flight path with the flight time of two hours.

As shown in FIG. 6B, process 600 may include generating a map for the flight path based on the stored information (block 635). For example, UAV platform 230 may generate a map for the flight path based on the weather information, the air traffic information, the obstacle information, the regulatory information, and/or the historical information stored in UAV platform 230 and/or data storage 235. In some implementations, UAV platform 230 may generate a three-dimensional map for the flight path based on the weather information, the air traffic information, the obstacle information, the regulatory information, and/or the historical information. For example, UAV platform 230 may determine air traffic (e.g., airplanes, other UAVs 220, etc.) for the flight path, obstacles (e.g., hills, mountains, buildings, cell towers, etc.) for the flight path, weather (e.g., rain, wind, snow, etc.) for the flight path, etc. and may generate a map that includes representations of the determined air traffic, obstacles, weather, etc.

As further shown in FIG. 6B, process 600 may include generating flight path instructions for the flight path based on the stored information (block 640). For example, UAV platform 230 may generate flight path instructions for the flight path based on the weather information, the air traffic information, the obstacle information, the regulatory information, and/or the historical information stored in UAV platform 230 and/or data storage 235. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc.

As further shown in FIG. 6B, process 600 may include providing the flight path instructions and the map for the flight path to the UAV (block 645). For example, UAV platform 230 may provide the flight path instructions and/or the map to UAV 220. In some implementations, UAV 220 may utilize the flight path instructions and/or the map to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions and/or the map to calculate a flight path for UAV 220 and to generate flight path instructions. In such implementations, the flight path instructions and/or the map provided by UAV platform 230 may include less detailed information, and UAV 220 may determine more detailed flight path instructions and/or a map via the computational resources of UAV 220.

In some implementations, sense and avoid capabilities of UAV 220 may be augmented due to UAV 220 being authenticated via the plug-and-play capability, based on component and/or capability information associated with UAV 220, based on aviation information (e.g., the weather information, the air traffic information, etc.), etc. In some implementations, UAV platform 230 and/or networks 240-260 may enhance the sense and avoid capabilities of UAV 220 (e.g., provided by a manufacturer of UAV 220).

As further shown in FIG. 6B, process 600 may include receiving feedback from the UAV, via the network(s), during traversal of the flight path by the UAV (block 650). For example, while UAV 220 is traveling along the flight path in accordance with the flight path instructions and/or the map, UAV 220 may provide feedback to UAV platform 230 via one or more of networks 240-260, and UAV platform 230 may receive the feedback. In some implementations, the feedback may include information received by sensors of UAV 220, such as visual information received from electromagnetic spectrum sensors of UAV 220 (e.g., images of obstacles), temperature information, wind conditions, etc. In some implementations, UAV 220 may utilize such feedback to detect and avoid any unexpected obstacles encountered by UAV 220 during traversal of the flight path. For example, if UAV 220 detects another UAV 220 in the flight path, UAV 220 may alter the flight path to avoid colliding with the other UAV 220.

In some implementations, the feedback may include a partial or complete failure of a component(s) of UAV 220. For example, assume that a rotor of UAV 220 typically utilizes one amperes (amps) of power to operate, but is failing and utilizing 1.5 amps to maintain a specified rotor speed. Such feedback may change a power requirement for UAV 220 to reach the destination location. A partial component failure might cause UAV 220 to require an emergency landing and request a reroute to a closest landing location.

As further shown in FIG. 6B, process 600 may include determining whether to modify the flight path based on the feedback from the UAV (block 655). For example, UAV platform 230 may determine whether to modify the flight path based on the feedback received from UAV 220. In some implementations, UAV platform 230 may determine to not modify the flight path if the feedback indicates that UAV 220 will safely arrive at the destination location. In some implementations, UAV platform 230 may determine to modify the flight path if the feedback indicates that UAV 220 is in danger of colliding with an obstacle (e.g., another UAV 220, a building, an airplane, etc.). In such implementations, UAV platform 230 may modify the flight path so that UAV 220 avoids colliding with the obstacle and/or remains a safe distance from the obstacle. In some implementations, UAV platform 230 may determine to modify the flight path if the feedback indicates that the weather conditions may prevent UAV 220 from reaching the destination location. For example, the wind conditions may change and cause the flight time of UAV 220 to increase to a point where the battery of UAV 220 will be depleted before UAV 220 reaches the destination location. In such an example, UAV platform 230 may modify the flight path so that UAV 220 either stops to recharge or changes altitude to improve wind conditions. In another example, rain or ice may increase the weight of UAV 220 and/or its payload and may cause the battery of UAV 220 to work harder to a point where the battery of UAV 220 will be depleted before UAV 220 reaches the destination location. In such an example, UAV platform 230 may modify the flight path so that UAV 220 stops to recharge before completing the flight path.

As further shown in FIG. 6B, if the flight path is to be modified (block 655—YES), process 600 may include generating modified flight path instructions and a modified map based on the feedback (block 660). For example, if UAV platform 230 determines that the flight path is be modified, UAV platform 230 may modify the flight path based on the feedback (e.g., as described above). In some implementations, UAV platform 230 may generate modified flight path instructions and a modified map for the modified flight path based on the feedback. In some implementations, the modified flight path instructions may include the features of flight path instructions, but may be modified based on the feedback. For example, the flight path instructions may be modified so that UAV 220 avoids colliding with an obstacle and/or remains a safe distance from the obstacle, stops to recharge, changes altitude to improve wind conditions, etc. In some implementations, the map may be modified in accordance with the modified flight path instructions.

As further shown in FIG. 6B, process 600 may include providing the modified flight path instructions and the modified map to the UAV (block 665). For example, UAV platform 230 may provide the modified flight path instructions and/or the modified map to UAV 220. In some implementations, UAV 220 may utilize the modified flight path instructions and/or the modified map to travel along the modified flight path. For example, UAV 220 may adjust a route and altitudes according to the modified flight path instructions, may detect and avoid any obstacles encountered in the modified flight path, etc. until UAV 220 arrives at the destination location. In some implementations, UAV 220 may continue to provide further feedback to UAV platform 230 during traversal of the modified flight path, and UAV platform 230 may or may not further modify the flight path based on the further feedback.

As further shown in FIG. 6B, if the flight path is not to be modified (block 655—NO), process 600 may include receiving a notification that the UAV arrived at the location (block 670). For example, if the feedback indicates that UAV 220 will safely arrive at the destination location, UAV platform 230 may determine that the flight path need not be modified. In some implementations, UAV 220 may continue along the flight path based on the flight path instructions and/or the map until UAV 220 arrives at the destination location. When UAV 220 arrives at the destination location, UAV 220 may provide a notification to UAV platform 230, via one or more of networks 240-260. In some implementations, the notification may indicate that UAV 220 has safely arrived at the destination location.

In some implementations, UAV platform 230 may provide secondary flight path instructions to UAV 220 while UAV 220 is traversing the flight path. For example, assume that local law enforcement issues an alert for a missing child (e.g., an Amber alert) while UAV 220 is traversing the flight path. In such an example, UAV platform 230 may provide UAV 220 and other UAVs 220 in the region with secondary tasks that include activating onboard cameras, zooming and/or focusing on objects or persons of interest, capturing images of the same, and providing the images with GPS coordinates to appropriate authorities. UAV 220 may continue to traverse the flight path (e.g., and delivering a package) while performing such secondary tasks.

In some implementations, UAV platform 230 may deploy UAVs 220 to create a communication network in remote areas and/or in a disaster or crisis situation. For example, during a disaster, cell towers may be disabled in a disaster area, which may prevent communication in the area. UAV platform 230 may deploy UAVs 220 (e.g., with wireless communication components) to create a wireless communication network that provides cell coverage for the area and enables individuals in the area to communicate outside of the area. UAVs 220 may extend the cell coverage from a closest unaffected cell tower or from ground-based mobile cell tower. UAVs 220 may provide constant cell coverage for the area and may be automatically replaced when UAVs 220 run low on battery power, are damaged, are not performing at optimal levels, etc. UAVs 220 and/or UAV platform 230 may monitor the area to ensure that UAVs 220 are providing proper wireless coverage for the area, to identify gaps in the coverage, to eliminate the gaps in the coverage (e.g., by deploying other UAVs 220 for the gaps), etc. In some implementations, UAVs 220 may provide video coverage of the disaster area to aid search/rescue efforts and provide security, and may include other components (e.g., thermal sensors, radiation sensors, chemical sensors, etc.) further provide assistance in the disaster area.

In some implementations, UAV platform 230 may deploy UAVs 220 (e.g., on behalf of authorities) to establish security and/or surveillance around a location (e.g., a location of an emergency situation) and provide complete video coverage of the location. UAVs 220 may include other components (e.g., context-appropriate sensors) that provide additional monitoring capabilities. For example, UAVs 220 may provide real time video and/or audio coverage to the authorities and the video and/or audio may be monitored by the authorities. In some implementations, the authorities may access the real time video and/or audio on user devices 210 (e.g., which may enable the authorities to avoid taking life threatening risks). In some implementations, cameras of UAVs 220 may be used for facial recognition to identify an individual in a crowd. In some implementations, UAVs 220 may help establish a tactical map of the location and identify personnel of the authorities based on user devices 210 and/or tags and highlight unknown individuals.

Although FIGS. 6A and 6B shows example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7A:
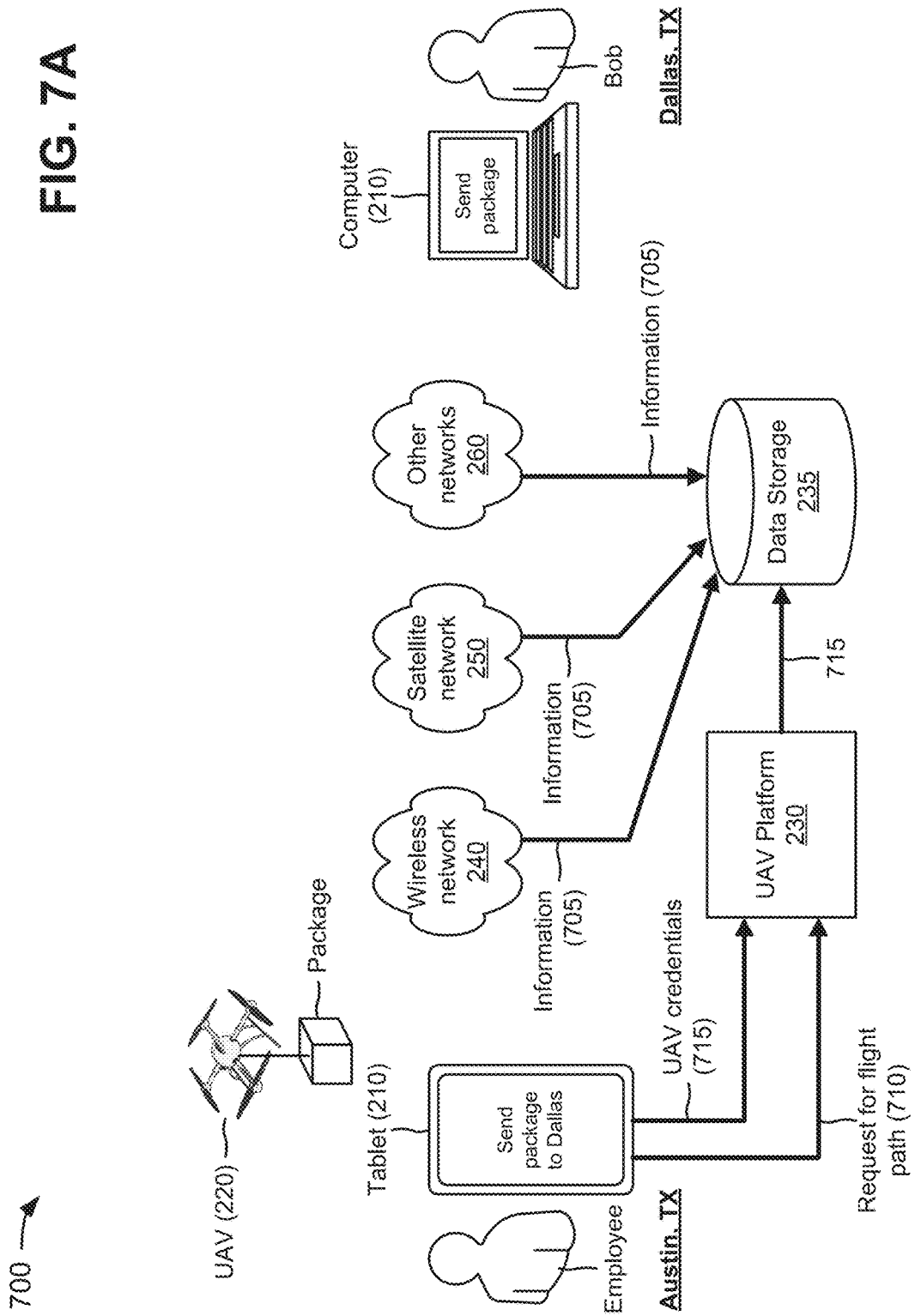

FIGS. 7A-7G are diagrams of an example 700 relating to example process 600 shown in FIGS. 6A and 6B. Assume that a first user device 210 (e.g., a tablet 210) is associated with a first user (e.g., an employee at a delivery company) that is located at an origination location (e.g., Austin, Tex.), as shown in FIG. 7A. Further, assume that a second user device 210 (e.g., a computer 210) is associated with a second user (e.g., Bob) that is located at a destination location (e.g., Dallas, Tex.), and that Bob has instructed computer 210 to request delivery of a package to Dallas, Tex. For example, computer 210 may inform tablet 210 and the employee that the package is to be delivered to Bob as soon as possible. Further, assume that the employee wants to utilize UAV 220 to fly the package from Austin, Tex. to a Dallas, Tex. in order to deliver the package to Bob. As further shown in FIG. 7A, UAV platform 230 and data storage 235 may communicate with wireless network 240, satellite network 250, and/or other networks 260. Wireless network 240, satellite network 250, and/or other networks 260 may provide, to data storage 235, information 705, such as capability information associated with UAVs 220, weather information associated with a geographical region (e.g., that includes a geographical location of Austin, Tex., a geographical location of Dallas, Tex., and geographical locations between Austin and Dallas), air traffic information associated with the geographical region, obstacle information associated with the geographical region, regulatory information associated with the geographical region, historical information associated with the geographical region, etc.

As further shown in FIG. 7A, the employee may instruct tablet 210 (or UAV 220) to generate a request 710 for a flight path (e.g., from Austin, Tex. to Dallas, Tex.) for UAV 220, and to provide request 710 to UAV platform 230. Request 710 may include credentials 715 (e.g., a serial number, an identifier of a UICC, etc.) associated with UAV 220, or credentials 715 may be provided separately from request 710 to UAV platform 230. UAV platform 230 may utilize credentials 715 to determine whether UAV 220 is authenticated for utilizing UAV platform 230 and/or one or more of networks 240-260, and is registered with an appropriate authority for use. For example, UAV platform 230 may compare credentials 715 with information provided in data storage 235 in order to determine whether UAV 220 is authenticated for utilizing UAV platform 230 and/or one or more of networks 240-260, and is registered with an appropriate authority.

As shown in FIG. 7B, data storage 235 may include account information 720, capability information 725, and/or weather information 730. Account information 720 may include identification numbers of UAVs 220, model numbers of UAVs 220, serial numbers of components of UAVs 220, government registration numbers of UAVs 220, other information that identifies UAVs 220, names of owners of UAVs 220, addresses of the owners, telephone numbers of owners, user names of the owners, passwords of the owners, account status information, etc. As further shown in FIG. 7B, account information 720 may be arranged in a data structure that includes a UAV account number field, an account type field, an address field, a status field, and a number of entries associated with the fields. The UAV account number field may include entries for identification numbers, model numbers, government registration numbers, etc. of UAVs 220. The account type field may include entries for account types (e.g., corporate, personal, government, etc.) associated with UAVs 220 identified in the UAV account number field. The address field may include entries for physical addresses associated with owners of UAVs 220 identified in the UAV account number field. The status field may include entries for statuses (e.g., paid, not in good standing, etc.) of accounts associated with UAVs 220 identified in the UAV account number field.

Capability information 725 may include capabilities associated with different components of UAVs 220, such as battery life, thrusts provided by rotors, flight times associated with amounts of fuel, etc. As further shown in FIG. 7B, capability information 725 may be arranged in a data structure that includes a serial number field, a model number field, a component field, a capabilities field, and a number of entries associated with the fields. The serial number field may include entries for serial numbers (e.g., "232114") of components of UAVs 220. The model number field may include entries for model numbers (e.g., "32678") associated with the components identified in the serial number field. The component field may include entries that include information (e.g., rotors, batteries, etc.) describing the components identified in the serial number field. The capabilities field may include entries that identify capabilities (e.g., thrusts, hours of operation, etc.) associated with the components identified in the serial number field.

Weather information 730 may include information associated with precipitation conditions (e.g., rain, snow, sleet, etc.), temperature conditions, wind conditions, cloud conditions, etc. for a geographical location (e.g., at different altitudes). As further shown in FIG. 7B, weather information 730 may be arranged in a data structure that includes a location field, a weather type field, a current conditions field, and a number of entries associated with the fields. The location field may include entries for locations (e.g., Austin, Tex.) associated with weather information 730. The weather type field may include entries for weather types (e.g., wind, precipitation, etc.) associated with the locations identified in the location field. The current conditions field may include entries that include current weather conditions (e.g., heavy rain, etc.) associated with the locations identified in the location field.

As shown in FIG. 7C, data storage 235 may further include air traffic information 735, obstacle information 740, regulatory information 745, and/or historical information 750. Air traffic information 735 may include information associated with air traffic (e.g., commercial flights, private airplanes, UAVs 220 associated with other platforms, etc.) for the geographical location. As further shown in FIG. 7C, air traffic information 735 may be arranged in a data structure that includes a location field, an air traffic type field, an altitude field, and a number of entries associated with the fields. The location field may include entries for locations (e.g., GPS coordinates) associated with air traffic information 735. The air traffic type field may include entries for air traffic types (e.g., commercial jet, other UAVs 220, etc.) associated with the locations identified in the location field. The altitude field may include entries that indicate altitudes (e.g., 10,000 meters, etc.) associated with the air traffic identified in the air traffic type field.

Obstacle information 740 may include information associated with obstacles (e.g., mountains, trees, bridges, buildings, cell towers, etc.) in the geographical location. As further shown in FIG. 7C, obstacle information 740 may be arranged in a data structure that includes a location field, an obstacle type field, a height field, and a number of entries associated with the fields. The location field may include entries for locations (e.g., latitude and longitude) associated with obstacle information 740. The obstacle type field may include entries for obstacle types (e.g., mountains, buildings, etc.) associated with the locations identified in the location field. The height field may include entries that indicate heights (e.g., 1,000 meters, etc.) associated with the obstacles identified in the obstacle type field.

Regulatory information 745 may include information associated with regulated air space (e.g., no fly zones, airports, government buildings, etc.) in the geographical location. As further shown in FIG. 7C, regulatory information 745 may be arranged in a data structure that includes a location field, a regulatory type field, an altitude field, and a number of entries associated with the fields. The location field may include entries for locations (e.g., 1st Street in Dallas, Tex.) associated with regulatory information 745. The regulatory type field may include entries for regulatory types (e.g., no fly zones, government buildings, etc.) associated with the locations identified in the location field. The altitude field may include entries that indicate altitudes (e.g., all altitudes) that are restricted due to the regulations.

Historical information 750 may include historical flight path information, historical weather information, historical air traffic information, etc. for the geographical location. As further shown in FIG. 7C, historical information 750 may be arranged in a data structure that includes a flight path field, an altitude field, a duration field, and a number of entries associated with the fields. The flight path field may include entries for historical flight paths between two locations (e.g., information indicating routes taken between Austin to Dallas, Tex.). The altitude field may include entries for altitudes (e.g., 1,000 meters, etc.) associated with the historical flight paths identified in the flight path field. The duration field may include entries for durations (e.g., 35 minutes, etc.) associated with the historical flight paths identified in the flight path field.

Figure 7D:
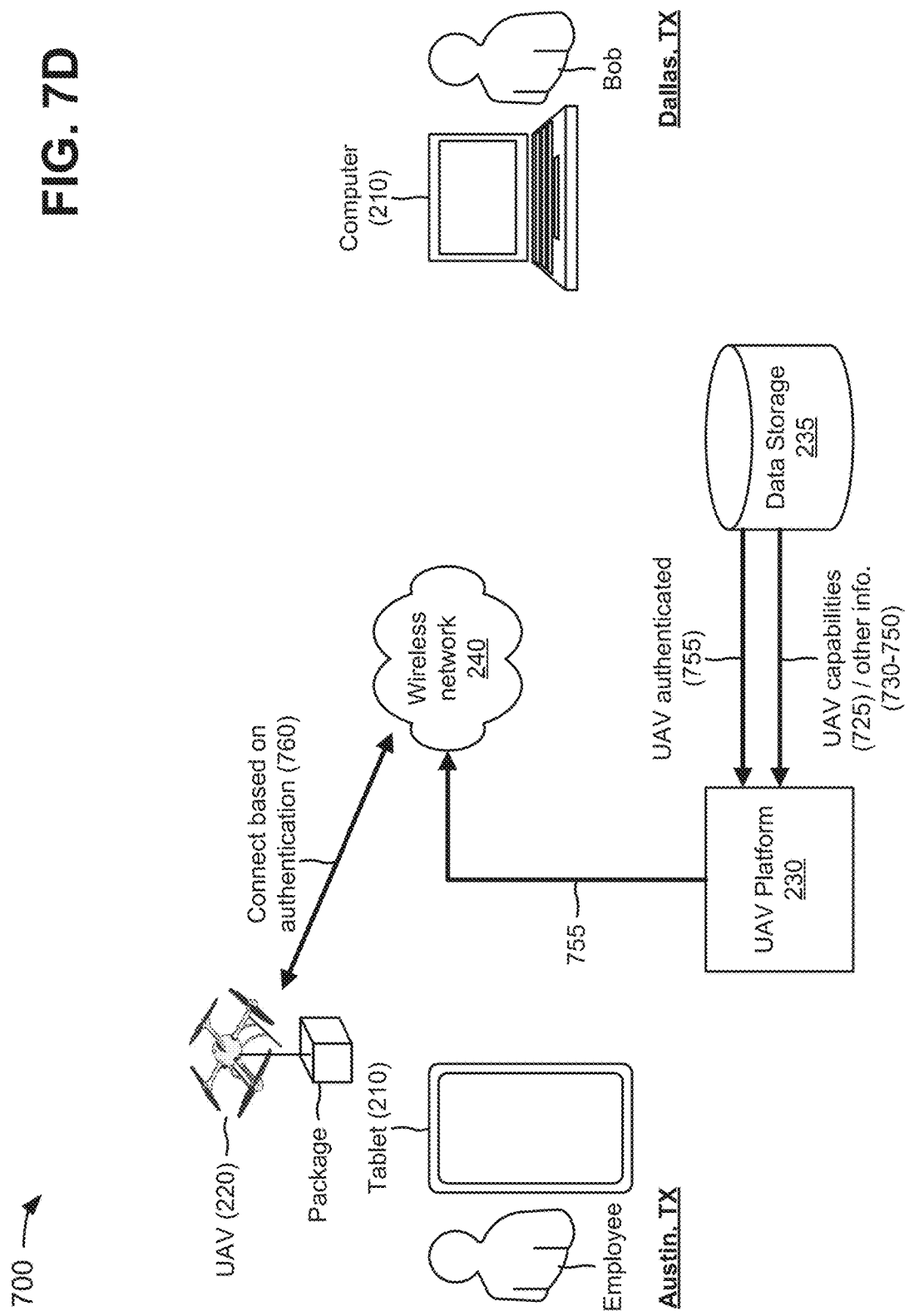

In some implementations, UAV platform 230 may compare credentials 715 with account information 720 to determine whether UAV 220 is authenticated for utilizing UAV platform 230 and/or one or more of networks 240-260, and is registered with an appropriate authority. As shown in FIG. 7D, assume that UAV 220 is authenticated, as indicated by reference number 755, and that UAV platform 230 provides a message 755 indicating that UAV 220 is authenticated to use one or more of networks 240-260. For example, UAV 220 may connect with wireless network 240 based on the authentication of UAV 220, as indicated by reference number 760. As further shown in FIG. 7D, UAV platform 230 may retrieve capability information 725 associated with UAV 220 and other information (e.g., weather information 730, air traffic information 735, obstacle information 740, regulatory information 745, and/or historical information 750) from data storage 235. In some implementations, UAV platform 230 may utilize information associated with UAV 220 (e.g., components of UAV 220, the requested flight path, etc.) to identify capability information 725 and other information 730-750 in data storage 235.

Figure 7E:
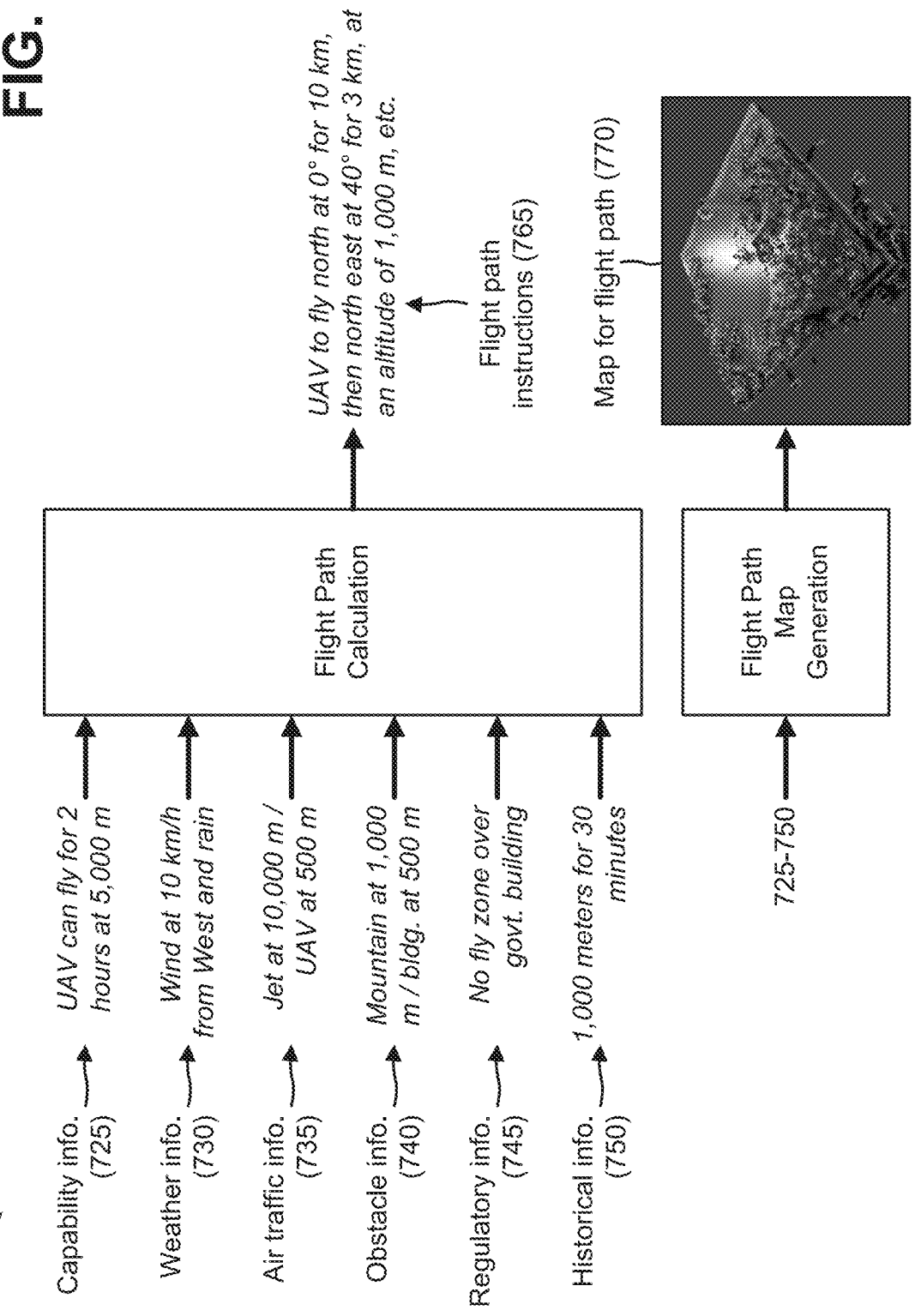

As shown in FIG. 7E, UAV platform 230 may calculate a flight path from Austin to Dallas, Tex. based on capability information 725 and/or other information 730-750, and may generate flight path instructions 765 for the flight path. For example, capability information 725 may indicate that UAV 220 can fly for two hours at an altitude of five-thousand meters; weather information 730 may indicate that the wind is ten kilometers per hour from the west and that it is raining; air traffic information 735 may indicate that a jet is at an altitude of ten-thousand meters and another UAV 220 is at an altitude of five-hundred meters; obstacle information 740 may indicate that a mountain is one-thousand meters in height and a building is five-hundred meters in height; regulatory information 745 may indicate that there is a no fly zone over a government building; and historical information 750 may indicate that a historical flight path had a duration of thirty minutes and an altitude of one-thousand meters. As further shown in FIG. 7E, flight path instructions 765 may include information instructing UAV 220 to fly north at zero degrees for ten kilometers, then northeast at forty degrees for three kilometers, at an altitude of one-thousand meters, etc. UAV platform 230 may also generate a map 770 for the flight path based on capability information 725 and/or other information 730-750.

Figure 7F:
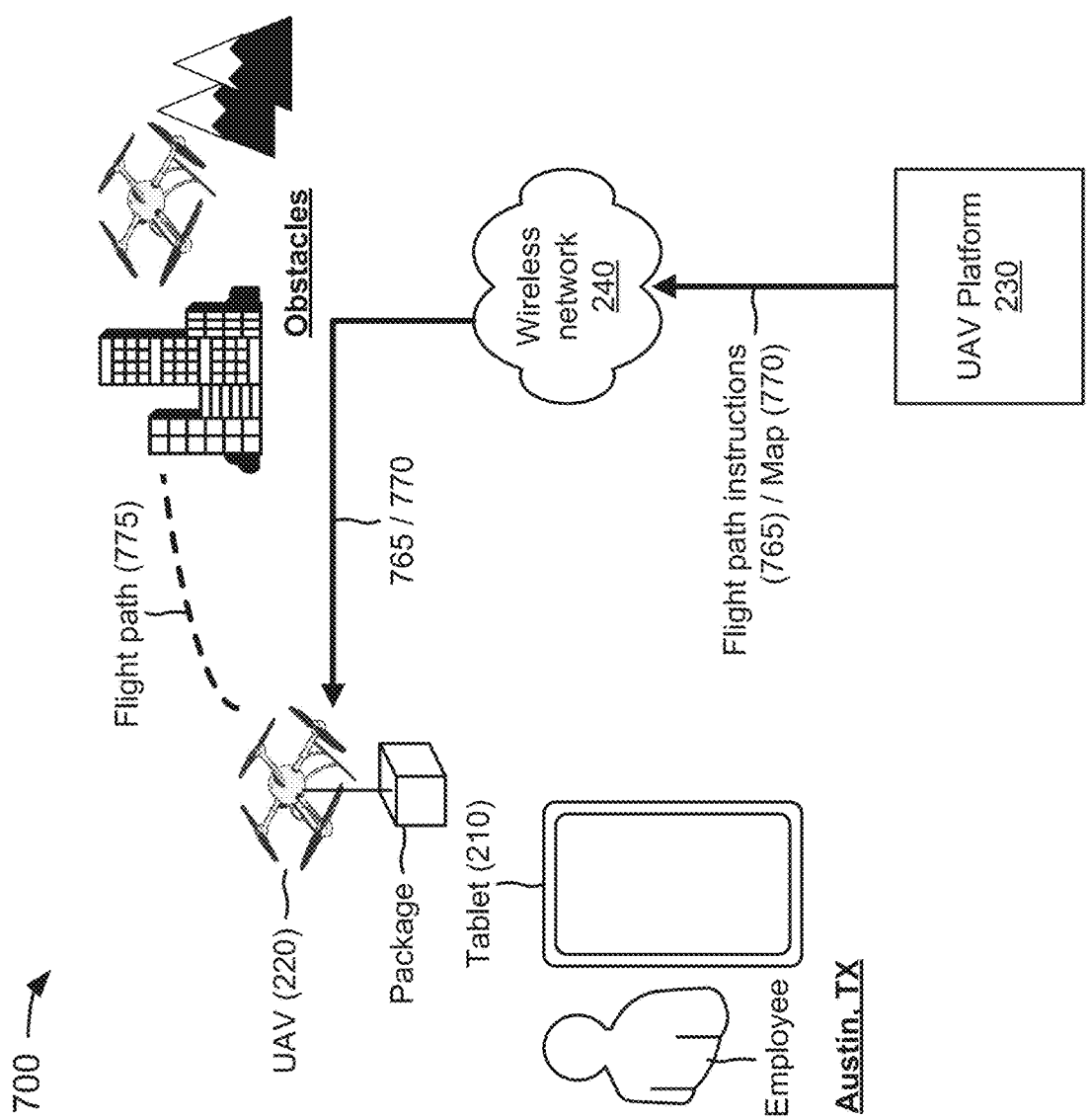

As shown in FIG. 7F, UAV platform 230 may provide flight path instructions 765 and/or map 770 to UAV 220 (e.g., via wireless network 240). UAV 220 may take off from Austin, Tex., and may travel flight path 775 based on flight path instructions 765 and/or map 770. While UAV 220 is traveling along flight path 775, one or more of networks 240-260 may receive feedback 780 from UAV 220 regarding traversal of flight path 775 by UAV 220 (e.g., speed, weather conditions, duration, etc.), as shown in FIG. 7G. Assume that UAV 220 senses an obstacle (e.g., a building) along flight path 775, and provides information about the obstacle to UAV platform 230 (e.g., via feedback 780). UAV platform 230 and/or UAV 220 may calculate a modified flight path that prevents UAV 220 from colliding with and/or remaining a safe distance from the building. UAV platform 230 and/or UAV 220 may generate modified flight path instructions 785 for a modified flight path 790. UAV platform 230 may provide modified flight path instructions 785 to UAV 220 (e.g., via wireless network 240), and UAV 220 may travel modified flight path 790, based on modified flight path instructions 785, until UAV 220 arrives at Dallas, Tex. When UAV 220 arrives at Dallas, Tex., UAV 220 and/or computer 210 may generate a notification 795 indicating that UAV 220 arrived safely at a particular GPS location in Dallas, Tex., and may provide notification 795 to UAV platform 230.

As indicated above, FIGS. 7A-7G are provided merely as an example. Other examples are possible and may differ from what was described with regard to FIGS. 7A-7G.

Systems and/or methods described herein may provide a platform that enables UAVs to safely traverse flight paths from origination locations to destination locations. The systems and/or methods may authenticate UAVs for utilizing wireless, satellite, etc. networks associated with the platform and to ensure that the UAVs are registered with an appropriate authority. The systems and/or methods may prevent UAVs from colliding with unexpected obstacles encountered during flights based on feedback provided by the UAVs to the platform, via the networks. The systems and/or methods may also provide distributed command and control to a UAV and the platform depending on capabilities of the UAV.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from an unmanned aerial vehicle, a request for a flight path, from a first geographical location to a second geographical location in a region, for the unmanned aerial vehicle to travel,
      the device being different from the unmanned aerial vehicle, and
      the request including credentials associated with the unmanned aerial vehicle;
   comparing, by the device, the credentials with information associated with an authority;
   authenticating, by the device and based on comparing the credentials with the information associated with the authority, the unmanned aerial vehicle,
      the authentication indicating that the unmanned aerial vehicle is authenticated to interact with the device in connection with the flight path from the first geographical location to the second geographical location,
      the authentication indicating that the unmanned aerial vehicle is authenticated to connect with a network, the network being associated with the device, and
      the authentication indicating that the unmanned aerial vehicle is registered with the authority;
   determining, by the device and when the unmanned aerial vehicle is authenticated, capability information for the unmanned aerial vehicle based on the request and component information associated with the unmanned aerial vehicle;
   calculating, by the device, the flight path from the first geographical location to the second geographical location based on the capability information, regulatory information associated with the region, and one or more of:
      weather information,
      air traffic information, or
      obstacle information,
   generating, by the device, flight path instructions for the flight path, from the first geographical location to the second geographical location, based on the regulatory information and one or more of:
      the weather information,
      the air traffic information,
      or the obstacle information,
   providing, by the device, the flight path instructions to the unmanned aerial vehicle to permit the unmanned aerial vehicle to travel from the first geographical location to the second geographical location,
      the unmanned aerial vehicle to travel the flight path, from the first geographical location to the second geographical location, based on the flight path instructions, and
      the unmanned aerial vehicle including communication functionality to extend wireless communication service;
   receiving, by the device and via the network, feedback from the unmanned aerial vehicle during traversal of the flight path, from the first geographical location to the second geographical location, by the unmanned aerial vehicle;
   determining, by the device, whether to modify the flight path, from the first geographical location to the second geographical location, based on the feedback;
   calculating, by the device, a modified flight path to the second geographical location based on the feedback; and
   generating, by the device, modified flight path instructions for the modified flight path to the second geographical location based on the feedback; and
   providing, by the device, the modified flight path instructions to the unmanned aerial vehicle,
      the unmanned aerial vehicle to travel the modified flight path to the second geographical location based on the modified flight path instructions.

2. The method of claim 1, further comprising:
denying the request, based on the unmanned aerial vehicle not being authenticated; and
providing, based on denying the request, a message to the unmanned aerial vehicle indicating that the request, is denied.

3. The method of claim 1, further comprising:
generating a map for the flight path, from the first geographical location to the second geographical location, based on the regulatory information and one or more of:
the weather information,
the air traffic information, or
the obstacle information, and
providing the map to the unmanned aerial vehicle.

4. The method of claim 1, further comprising:
receiving a notification indicating that the unmanned aerial vehicle arrived at the second geographical location based on the unmanned aerial vehicle arriving at the second geographical location.

5. The method of claim 1, where the method further comprises:
receiving at least one of:
the weather information,
the air traffic information,
the obstacle information, or
the regulatory information; and
storing the at least one of:
the weather information,
the air traffic information,
the obstacle information, or
the regulatory information.

6. A system, comprising:
a storage device to store:
weather information associated with a region,
air traffic information associated with the region,
obstacle information associated with the region, and
regulatory information associated with the region; and
one or more devices to:
receive, from an unmanned aerial vehicle, a request for a flight path, from a first geographical location to a second geographical location in the region, for the unmanned aerial vehicle,
the one or more devices being different from the unmanned aerial vehicle, and
the request including credentials associated with the unmanned aerial vehicle;
compare the credentials with information associated with an authority;
authenticate, based on comparing the credentials with the information associated with the authority, the unmanned aerial vehicle,
the authentication indicating that the unmanned aerial vehicle is authenticated to interact with the one or more devices in connection with the flight path from the first geographical location to the second geographical location,
the authentication indicating that the unmanned aerial vehicle is authenticated to connect with a network,
the network being associated with the one or more devices, and the authentication indicating that the unmanned aerial vehicle is registered with the authority;
determine, when the unmanned aerial vehicle is authenticated, capability information for the unmanned aerial vehicle based on the request and component information associated with the unmanned aerial vehicle;
calculate the flight path from the first geographical location to the second geographical location based on the capability information, regulatory information associated with the region and one or more of:
the weather information,
the air traffic information, or
the obstacle information,
generate flight path instructions for the flight path, from the first geographical location to the second geographical location, based on the regulatory information and one or more of:
the weather information,
the air traffic information, or
the obstacle information,
provide the flight path instructions to the unmanned aerial vehicle to permit the unmanned aerial vehicle to travel from the first geographical location to the second geographical location,
the unmanned aerial vehicle including communication functionality to extend wireless communication service;
receive, via the network, feedback from the unmanned aerial vehicle during traversal of the flight path, from the first geographical location to the second geographical location, by the unmanned aerial vehicle;
determine whether to modify the flight path, from the first geographical location to the second geographical location, based on the feedback;
calculate, based on determining to modify the flight path, a modified flight path to the second geographical location based on the feedback;
generate modified flight path instructions for the modified flight path to the second geographical location based on the feedback; and
provide the modified flight path instructions to the unmanned aerial vehicle,
the unmanned aerial vehicle to travel the modified flight path to the second geographical location based on the modified flight path instructions.

7. The system of claim 6, where the one or more devices are further to:
deny the request, based on the unmanned aerial vehicle not being authenticated; and
provide, based on denying the request, a message to the unmanned aerial vehicle indicating that the request, is denied.

8. The system of claim 6, where the one or more devices are further to:
generate a map for the flight path, from the first geographical location to the second geographical location, based on one or more of:
the weather information,
the air traffic information,
the obstacle information, or
the regulatory information associated with the region; and
provide the map to the unmanned aerial vehicle.

9. The system of claim 6, where the one or more devices are further to:
receive a notification indicating that the unmanned aerial vehicle arrived at the second geographical location based on the unmanned aerial vehicle arriving at the second geographical location.

10. The system of claim 6, where the one or more devices are further to:
receive at least one of:

the weather information,
the air traffic information,
the obstacle information, or
the regulatory information associated with the region; and
store, in the storage device, the at least one of:
the weather information,
the air traffic information,
the obstacle information, or
the regulatory information associated with the region.

11. A non-transitory computer-readable medium storing instructions, the instructions comprising:
one or more instructions that, when executed by one or more processors of a device, cause the one or more processors to:
receive, from an unmanned aerial vehicle, a request for a flight path, from a first geographical location to a second geographical location in a region, for the unmanned aerial vehicle, and credentials associated with the unmanned aerial vehicle,
the device being different from the unmanned aerial vehicle;
compare the credentials with information associated with an authority;
authenticate, based on comparing the credentials with the information associated with the authority, the unmanned aerial vehicle,
the authentication indicating that the unmanned aerial vehicle is authenticated to interact with the device in connection with the flight path from the first geographical location to the second geographical location,
the authentication indicating that the unmanned aerial vehicle is authenticated to connect with a network,
the network being associated with the device, and
the authentication indicating that the unmanned aerial vehicle is registered with the authority;
determine, when the unmanned aerial vehicle is authenticated, capability information for the unmanned aerial vehicle based on the request and component information associated with the unmanned aerial vehicle;
calculate the flight path from the first geographical location to the second geographical location based on the capability information, regulatory information associated with the region, and one or more of:
weather information,
air traffic information; or
obstacle information,
generate flight path instructions for the flight path, from the first geographical location to the second geographical location, based on the regulator information and one or more of:
the weather information,
the air traffic information, or
the obstacle information,
provide the flight path instructions to the unmanned aerial vehicle to permit the unmanned aerial vehicle to travel from the first geographical location to the second geographical location,
the unmanned aerial vehicle to travel the flight path, from the first geographical location to the second geographical location, based on the flight path instructions, and
the unmanned aerial vehicle including, communication functionality to extend wireless communication service;
receive, via the network, feedback from the unmanned aerial vehicle during traversal of the flight path, from the first geographical location to the second geographical location, by the unmanned aerial vehicle;
determine whether to modify the flight path, from the first geographical location to the second geographical location, based on the feedback;
calculate, based on determining to modify the flight path, a modified flight path to the second geographical location based on the feedback;
generate modified flight path instructions for the modified flight path to the second geographical location based on the feedback; and
provide the modified flight path instructions to the unmanned aerial vehicle,
the unmanned aerial vehicle to travel the modified flight path to the second geographical location based on the modified flight path instructions.

12. The non-transitory computer-readable medium of claim 11, where the one or more instructions, when executed by the one or more processors, further cause the one or more processors to:
deny the request, based on the unmanned aerial vehicle not being authenticated; and
provide, based on denying the request, a message to the unmanned aerial vehicle indicating that the request, is denied.

13. The non-transitory computer-readable medium of claim 11, where the one or more instructions, when executed by the one or more processors, further cause the one or more processors to:
generate a map for the flight path, from the first geographical location to the second geographical location, based on one or more of:
the weather information,
the air traffic information,
the obstacle information, or
the regulator information associated with the region; and
provide the map to the unmanned aerial vehicle.

14. The non-transitory computer-readable medium of claim 11, where the one or more instructions, when executed by the one or more processors, further cause the one or more processors to:
receive a notification indicating, that the unmanned aerial vehicle arrived at the second geographical location based on the unmanned aerial vehicle arriving at the second geographical location.

15. The method of claim 1, where the request for the flight path, from the first geographical location to the second geographical location, includes a predetermined set of actions for the unmanned aerial vehicle to perform based on certain conditions occurring.

16. The method of claim 1, where the unmanned aerial vehicle includes a protocol to communicate with other unmanned aerial vehicles.

17. The system of claim 6, where the capability information is associated with component information of the unmanned aerial vehicle,
the component information including at least one of:
a battery,
an engine, and
a rotor type.

18. The system of claim 17, where the capability information includes information associated with at least one of:
   battery life,
   flight times associated with amount of fuel, and
   thrust of rotors.

19. The non-transitory computer-readable medium of claim 11, where the request, includes a predetermined set of actions for the unmanned aerial vehicle to perform based on certain conditions occurring.

20. The non-transitory computer-readable medium of claim 11, where the unmanned aerial vehicle includes a protocol to communicate with other unmanned aerial vehicles based on the unmanned aerial vehicle losing communication with a wireless network.

* * * * *